US010628899B2

(12) United States Patent
Greenberg

(10) Patent No.: US 10,628,899 B2
(45) Date of Patent: Apr. 21, 2020

(54) TRAVEL PLANNING APPLICATION

(71) Applicant: Nearby Colleges LLC, New York, NY (US)

(72) Inventor: Eric Steven Greenberg, New York, NY (US)

(73) Assignee: Nearby Colleges LLC, New York, NY (US)

( * ) Notice: Subject to any disclaimer, the term of this patent is extended or adjusted under 35 U.S.C. 154(b) by 73 days.

(21) Appl. No.: 15/875,093

(22) Filed: Jan. 19, 2018

(65) Prior Publication Data

US 2018/0143026 A1    May 24, 2018

Related U.S. Application Data

(63) Continuation of application No. 15/617,528, filed on Jun. 8, 2017, now abandoned, which is a continuation-in-part of application No. 13/942,705, filed on Jul. 16, 2013, now abandoned.

(60) Provisional application No. 61/676,118, filed on Jul. 26, 2012.

(51) Int. Cl.
   *G01C 21/34*     (2006.01)
   *G01C 21/36*     (2006.01)
   *G06F 3/0484*     (2013.01)
   *G06Q 50/14*     (2012.01)
   *G06Q 50/20*     (2012.01)
   *G06F 16/9535*     (2019.01)
   *H04W 88/02*     (2009.01)
   *G06Q 50/00*     (2012.01)

(52) U.S. Cl.
   CPC .......... *G06Q 50/14* (2013.01); *G01C 21/343* (2013.01); *G01C 21/3476* (2013.01); *G01C 21/3614* (2013.01); *G01C 21/3676* (2013.01); *G01C 21/3682* (2013.01); *G06F 16/9535* (2019.01); *G06Q 50/2053* (2013.01); *G06Q 50/01* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 4,768,087 A | 8/1988 | Taub et al. | |
| 4,820,167 A | 4/1989 | Nobles et al. | |
| 5,310,349 A | 5/1994 | Daniels et al. | |
| 5,760,771 A | 6/1998 | Blonder et al. | |
| 5,864,869 A | 1/1999 | Doak et al. | |
| 6,317,684 B1 * | 11/2001 | Roeseler | G01C 21/3415 340/990 |
| 6,533,583 B1 | 3/2003 | Sportelli | |

(Continued)

*Primary Examiner* — Thomas G Black
*Assistant Examiner* — Demetra R Smith-Stewart
(74) *Attorney, Agent, or Firm* — Zeller IP Group, PLLC; Kyle M. Zeller

(57) ABSTRACT

A method for travel planning which includes a customized application and results in efficient customized grouping and coordination of selected locations and destinations based on a combination of user-selected criteria; radius searching; and real-time, simultaneous, multi-source data gathering, analysis, and derivation executed by and presented on a computer or smart device for user preference. At least one embodiment focuses on travel planning for visiting colleges and universities prior to making decisions on where to apply to or where to enroll.

20 Claims, 12 Drawing Sheets

(56) References Cited

U.S. PATENT DOCUMENTS

| | | |
|---|---|---|
| 6,676,413 B1 | 1/2004 | Best et al. |
| 6,778,973 B2 | 8/2004 | Harlan |
| 6,813,474 B2 | 11/2004 | Robinson et al. |
| 6,865,368 B2 | 3/2005 | Hoyashita et al. |
| 6,915,286 B2 | 7/2005 | Policastro et al. |
| 6,980,999 B1 | 12/2005 | Grana |
| 7,174,311 B1 | 2/2007 | Galietti |
| 7,362,852 B1 | 4/2008 | Rodkey et al. |
| 7,391,314 B2 | 6/2008 | Lemmon |
| 7,398,235 B1 | 7/2008 | Westrick |
| 7,610,365 B1 | 10/2009 | Kraft et al. |
| 7,684,548 B1 | 3/2010 | Rodkey et al. |
| 7,831,509 B1 | 11/2010 | Ireland et al. |
| 7,835,985 B2 | 11/2010 | Ireland et al. |
| 7,895,065 B2 | 2/2011 | Purang et al. |
| 7,961,110 B2 | 6/2011 | Lemmon |
| 8,015,210 B2 | 9/2011 | Daga |
| 8,050,948 B2 | 11/2011 | Purang et al. |
| 8,050,949 B2 | 11/2011 | Purang et al. |
| 8,140,097 B2 | 3/2012 | Silk |
| 8,156,025 B1 | 4/2012 | Gymer et al. |
| 8,180,274 B2 | 5/2012 | Bender |
| 8,187,004 B1 | 5/2012 | DeSensi et al. |
| 8,239,478 B2 | 8/2012 | Bruker |
| 8,260,776 B2 | 9/2012 | France-Prouvoste |
| 8,364,508 B2 | 1/2013 | Farina et al. |
| 8,418,223 B1 | 4/2013 | Smith et al. |
| 8,562,354 B2 | 10/2013 | Groot et al. |
| 8,619,948 B2 | 12/2013 | Moore et al. |
| 8,690,773 B2 | 4/2014 | Bagan |
| 9,639,901 B2 * | 5/2017 | Montoya ............... H04W 4/023 |
| 2001/0047310 A1 | 11/2001 | Russell |
| 2002/0023095 A1 | 2/2002 | Baba et al. |
| 2002/0028426 A1 | 3/2002 | Pasant |
| 2002/0110796 A1 | 8/2002 | Sugano et al. |
| 2002/0177109 A1 | 11/2002 | Robinson et al. |
| 2002/0178038 A1 | 11/2002 | Grybas |
| 2003/0018605 A1 | 1/2003 | Policastro et al. |
| 2003/0172041 A1 | 9/2003 | Dicrosta et al. |
| 2003/0216943 A1 | 11/2003 | McPhee et al. |
| 2004/0110119 A1 | 6/2004 | Riconda et al. |
| 2004/0138913 A1 | 7/2004 | Guerra |
| 2004/0145475 A1 | 7/2004 | Greenberger |
| 2004/0155452 A1 | 8/2004 | Sfassie |
| 2004/0162707 A1 | 8/2004 | Saint-Amour et al. |
| 2004/0167786 A1 | 8/2004 | Grace |
| 2004/0214600 A1 | 10/2004 | Schechet et al. |
| 2005/0055238 A1 | 3/2005 | Wisnosky et al. |
| 2005/0060234 A1 | 3/2005 | Reahard |
| 2006/0069576 A1 | 3/2006 | Waldorf et al. |
| 2006/0106778 A1 | 5/2006 | Baldwin |
| 2007/0032240 A1 * | 2/2007 | Finnegan ................ H04W 4/21 455/445 |
| 2007/0112507 A1 | 5/2007 | Bargeron et al. |
| 2008/0270166 A1 * | 10/2008 | Morin .................... G06Q 10/06 705/326 |
| 2008/0275646 A1 | 11/2008 | Perng et al. |
| 2009/0081629 A1 * | 3/2009 | Billmyer ................. G09B 7/02 434/362 |
| 2010/0241350 A1 * | 9/2010 | Cioffi ..................... A61H 3/061 701/533 |
| 2011/0301835 A1 | 12/2011 | Bongiorno |
| 2011/0302159 A1 | 12/2011 | Mikesell et al. |
| 2012/0109514 A1 | 5/2012 | Tang |
| 2012/0264098 A1 * | 10/2012 | Megargel ................ G09B 7/02 434/322 |
| 2013/0006705 A1 | 1/2013 | Votaw et al. |
| 2013/0030849 A1 | 1/2013 | Bongiorno |
| 2013/0103315 A1 * | 4/2013 | Sebastian ........... G01C 21/3697 701/538 |
| 2014/0032437 A1 | 1/2014 | Greenberg |
| 2014/0164504 A1 | 6/2014 | Dellenbach et al. |

* cited by examiner

37

TRAVEL PLANNING APPLICATION

CROSS-REFERENCE TO RELATED APPLICATIONS

The present application is a continuation of U.S. utility patent application Ser. No. 15/617,528, titled "TRAVEL PLANNING APPLICATION RESULTING IN EFFICIENT CUSTOMIZED GROUPING AND COORDINATION OF SELECTED LOCATIONS AND DESTINATIONS BASED ON THE COMBINATION OF USER SELECTED IMPORTANT CRITERIA, RADIUS SEARCHING, AND REAL TIME SIMULTANEOUS MULTI-SOURCE DATA GATHERING, ANALYSIS, AND DERIVATION EXECUTED BY AND PRESENTED ON A COMPUTER AND/OR SMART DEVICE FOR USER PREFERENCE," having a filing date of Jun. 8, 2017, which is a continuation-in-part of U.S. utility patent application Ser. No. 13/942,705, titled "Travel App," having a filing date of Jul. 16, 2013, which claims benefit of priority to U.S. provisional patent application Ser. No. 61/676,118, titled "Computer and/or phone APP that lets user find colleges (and what I am calling "basic info" about the colleges such as size, cost, tours, info sessions, their website, contact info etc.) within a user chosen radius to make college visits more economical, more useful and more convenient," having a filing date of Jul. 26, 2012. Each of the above applications is incorporated by reference herein in its entirety.

BACKGROUND

The present invention is a method for creating unique groups of locations to be included in travel destination itinerary based on customized criteria and real-time communications, and radius searching, which aides in the reduction of time increasing ones' options and enhancing the experience of visiting locations and destinations. The present invention was made to fill a gap in visiting/searching for and choosing from destinations, generally, and, more specifically, colleges and universities ("C/Us").

Geography is an important factor when deciding on C/Us since it has been shown that an estimated 75% of college students go to schools within approximately 230 miles of their homes (Journal of College Admission). However, no prior art was found that specifically discloses a specialized C/U visitation program to aid in locating relevant, nearby C/Us or that concerns a visitation trip where a goal is a pre-attendance C/U trip.

The state of the prior art does not deal specifically with pre-attendance C/U travel planning; the prior art does not live feed curriculum/course information or allow the input of student specific information (e.g., qualifying SAT/GPAs) and/or C/U-specific information (e.g., student population, average tuition costs, etc.) to help choose appropriate and relevant nearby C/Us. Most college research tools cover so many bases that they either do not address the college visit in depth at all or they spend time addressing what goes on after the student is enrolled in school.

The present invention addresses these issues by allowing for a search for relevant C/Us over a certain size area over the radius you choose, and providing relevant information about each school, along with details such as size, cost, tours, info sessions, their website, contact info, etc. This invention saves time by maximizing efficiency and saves money by minimizing travel costs while also presenting options and choices that might have been missed without this app.

SUMMARY

The present invention relates to a method for visiting, searching for, or choosing from a variety of destinations, generally, and more specifically, C/Us, using radius searching. It can combine primary target or primary desired and secondary nearby destinations as well as data input of different types to narrow search results. More relevant search results are also obtained by searching within a desired radius of a primary target or primary desired location, secondary nearby destinations, or other destination.

The search results can be provided in the form of an itinerary together with directions for visiting the destinations. They can also include relevant information about the destinations, as well as information about local restaurants, lodging, gas stations, and other possible stops or sites along the way.

The system and method of the invention also makes possible two-way communication between the user and the destination to allow the user to make appointments (e.g., schedule interviews), reservations (e.g., for dinner), etc. The system and method of the invention can be included in the form of a mobile app to make it easier to make such appointments and reservations on the go and to obtain relevant information about nearby destinations to add to the itinerary if time permits, all of which make travelling more economical, more useful and more convenient.

The system and method of the invention lets a user find destinations within a chosen radius to make visits, including travel directions/options, local restaurants, hotels, gas stations, etc. pertaining to the trip itineraries. The present invention fills a niche that no other applications fully explore.

When using the system and method of the invention, a search for relevant C/Us over a certain size area over a radius you choose, provides relevant information about each school, along with details such as size, cost, tours, info sessions, their website, contact information, etc.

A method of creating at least one new uniquely created group, and customized list and map, which includes C/Us meeting a specific customized criteria, by conducting a search with specific customized criteria including a location search of CUs, resulting in preparing at least one new uniquely created group and customized list, itinerary and, mapped route to visit C/Us, and a uniquely created list providing criteria and information for communicating with C/Us and/or direct communication immediate and in real time to the C/Us contained in the at least one new uniquely created group that is created and selected by at least one user and customizing the unique group by selecting from a uniquely formatted on screen visual presentation of all the matched choices presented to said user utilizing the screen of a user smart device running a specific software application, such method allowing for at least one user directed to utilizing a specific mechanical device that functions running software specially to retrieve data such as location data and upload the information so that the claimed method generates and presents information in real time together for the user to then make selections from and follow through the other steps of the claimed method as the users are directed towards performing steps leading to identifying the potential stops and locations creating a new data file containing new relevant groups combining together from different sources to produce the resulting group which technology rooted in computer identifies elements and sources together and grouping them in real time in a new unique group of required elements allowing for large amounts of data about C/U's, locations and the sources along with various additional data to be displayed on a smart device and for the information to be reviewed by the user at a glance thus comprising of the following steps: initiating the method by downloading a specific software application, registering for a sign-in process, initiating and running of a specific software application on a user smart device, operated by at least one user; initiating and running of a specific software application on a user smart device, operated by at least one user; receiving of the input of student data input by at least one user wherein said student data is comprised of specific student qualifications and student choices, utilizing user smart device comprising a global position system ("GPS") or other technology receiver, a display, an input device, a microprocessor, a wireless communication transceiver, and running specific software application that utilizes at least one storage database containing information related to C/Us and other preselected content; calculating and determining unique list of C/Us where the information related to C/Us and other preselected content from the at least one storage database matches or is comparable to the criteria of the student data; receiving specific locating information from the GPS or other technology receiver live or supplied from the input device and a desired radius limitation from user input to input device, wherein the locating information is used as the center or starting point from which the radius limitation extends; generating a unique list or group and a map to be presented in a unique formatted visual presentation showing the locations of C/Us that are relevant to the student data, relevant to the information contained in the storage database, and located within the radius limitation received from the information input into the input device by calculating the distance between the C/Us on the list of C/Us where the information related to C/Us and other preselected content from the storage database matches or is comparable to the student data and the locating information and determining which C/Us are within the radius limitation received by the input device; displaying in said unique formatted visual presentation the said unique list or group of C/Us that are relevant to the student data, relevant to the information contained in the storage database, and located within the radius limitation received from the input device on the display, receiving a selection from the information input into the input device of one or more C/Us from the list and map showing the locations of relevant C/Us generated, generate information about the selected C/Us, and display said information about the selected C/Us, an itinerary of the selected C/Us and a planned route or journey on the display, wherein the planned route or journey includes public or other methods of transportation, selected by at least one user customizing the unique group from a unique formatted visual presentation to said user utilizing a user smart device running a specific software application; transmitting one-way communication(s) to or transmit to and receive two-way communication(s) from relevant C/Us via the wireless communication transceiver, receiving a selection from the input device of one or more C/Us from the list of relevant C/Us generated, and save the one or more C/Us selected from the list of relevant C/Us as a new group created by the combination of these steps, and executing and performing at least one of: receiving a second group of locating information, and a second desired radius limitation from the input device, generating and displaying a second unique list and map showing the locations of C/Us that are relevant to the student data, relevant to the information contained in the storage database, and located within the second radius limitation received from the input device by calculating the distance between the C/Us on the list of C/Us where the information related to C/Us and other preselected content from the storage database matches or is comparable to the student data and the second locating information and determining which C/Us are within the second radius limitation received by the input device, receiving a selection from the input device of one or more C/Us from the list of relevant C/Us generated, generating information about the selected C/Us, and displaying said information about the selected C/Us, an itinerary of the selected C/Us and planned route or journey on the display a new group created by the combination of these steps that are a combination of steps that can only be performed on a computer and steps, only human performed, receiving a request from the input device for a repeat search of C/Us within a radius limitation of one or more selected C/Us, generating and displaying a list and map of the locations of repeat C/Us within the radius limitation of one or more selected C/Us, receiving a selection of repeat C/Us of interest from the input device, generating information about the selected C/Us of interest, and displaying said information about the selected C/Us of interest on the display a new group created by the combination of these steps that are a combination of steps that can only be performed on a computer and steps only human performed, and/or destinations relevant to other data within the radius limitation to be offered for selection, and receiving a selection of one or more other stops and/or destinations from the input device for adding to the itinerary and planned route or journey and/or providing information about food, gas, and/or lodging on the display a new group created by the combination of these steps that are a combination of steps that can only be performed on computer and steps only human performed, receiving student data for another group, which is the same or different from the student data previously received from the input device, receiving locating information for another group, which is the same or different from the locating information previously received by the input device and/or a desired radius limitation from the input device, and generating and displaying a list of C/Us relevant to the student data for said another new group, and receiving a selection of one or more C/Us from the list of C/Us relevant to the student data for said another group and saving the selected C/Us on the display a new group created by the combination of these steps that are a combination of steps that can only be performed on computer and steps only human performed, and receiving further student data to generate at least one combined list and group of C/Us.

The method may include that student qualifications comprise of at least one of standardized test scores (e.g., SAT scores and/or ACT scores), GPA scores, school attended, school attending, year of graduation, public or private school, years of attendance, high school attending, high school attended, type of education, degree(s), grade(s), course(s), curriculum, school rating, class rating, class ranking, student rating, and/or student ranking.

The method may include that student choices comprise of at least one of curriculum, degrees offered, school requirements, public or private, tuition, additional school costs, extracurricular activities, school organizations, student organizations, size of school, type of school, housing, school statistics, school information, school data, school criteria, school history, faculty, faculty information, school achievements or honors, school reputation, school area information, distance coordinates, and/or travel considerations.

The method may include that the locating information comprises of at least one of: longitude, latitude, location coordinates, a city, zip code, street address, street name, state, nearby location, county, village, town, landmark, destination (optionally including a destination address in part or in whole), college, university, school, school name, phone number (in part or in whole), email, web address, social media address, Skype name, information that helps to determine the starting or beginning point of a search, and/or information that helps to determine any point or destination of a search.

The method may include wherein the input device is at least one of: tablet, smart phone, phone, smart device, computer, electronic device, handheld device, iPhone, iPad, mobile phone, touch screen computing device, portable media player, smart pad, smart device, micro device, portable device, powered device, technical device, electronic component device, iOS device, optical device, optical reader, information or data input communication device, visual device, or any other device capable of interfacing with a communications network.

The method may include that the information generated about the selected C/Us comprises at least one of student population, average annual tuition, tuition, and at least one of tour availability, admissions information, admissions appointments or availability, visiting information, tour information, and/or information sessions.

The method may include that the information generated about the selected C/Us comprises at least one of: a link to communicate with, call the C/Us, link to the C/Us' website, link to make an online appointment for an interview, and/or link to the C/Us' Facebook page or other social media.

The method may include that further comprising a software element that can utilize a map application programming interface ("API").

The method may include that the communication via wireless communication transceiver is at least one of 2-way text-to-cell communication, 2-way voice communication, 2-way social media communications, 2-way texting, 2-way phone, 2-way SMS and/or MMS, and 2-way communication.

The method may include that the mobile device is further programmed to receive and execute a request from the input device for sorting the generated C/Us by one or more of distance, price, schools, divisions, majors, curriculums, clubs, sports, activities, organizations, student information, school information, student qualifications, school qualifications, honors, awards, financial aid, scholarships, student employment information, student population, average annual tuition, tour availability, information sessions, and/or size.

The invention in some embodiments is a system for conducting a location-based search of CUs, preparing an itinerary and mapped route to visit C/Us, and communicating with C/Us comprising: a mobile device comprising a GPS or other technology receiver, a display, an input device, a microprocessor, a wireless communication transceiver, and a software program that utilizes information stored in a storage database, the mobile device programmed to: receive locating information from the GPS or other technology receiver or the input device and a desired radius limitation from the input device, wherein the locating information is used as the center or starting point from which the radius limitation extends; generate and display a list and map, the list displaying and the map showing the locations of all C/Us that are located within the radius limitation received from the input device by calculating the distance between the C/Us and the locating information and determining which C/Us are within the radius limitation received by the input device; receive a selection from the input device of one or more C/Us from the list displaying, and map showing the locations of relevant C/Us generated, generate information about the selected C/Us, and display said information about the selected C/Us, an itinerary of the selected C/Us and a planned route or journey on the display, wherein the planned route or Journey includes public or other methods of transportation, transmit one-way communication(s) to or transmit to or receive two-way communication(s) from at least one selected destination C/U via the wireless communication transceiver, receive a selection from the input device of one or more C/Us from the list of relevant C/Us generated, and save the one or more C/Us selected from the list of relevant C/Us as a group; and execute and perform at least one of: receiving a second locating information, which can be the same or different from the first locating information, and a second desired radius limitation, which can be the same or different from the first desired radius limitation, from the input device, generating and displaying a list and map showing the locations of all C/Us that are located within the second radius limitation received from the input device by calculating the distance between the C/Us and the second locating information and determining which C/Us are within the second radius limitation received by the input device, receiving a selection from the input device of one or more C/U s from the list of relevant C/Us generated, generating information about the selected C/Us, and displaying said information about the selected C/Us, an itinerary of the selected C/Us and planned route or journey on the display; receiving a request from the input device for a repeat search of C/Us within a radius limitation of one or more selected C/Us; generating and displaying a list and map of the locations of repeat C/Us within the radius limitation of one or more selected C/Us, receiving a selection of repeat C/Us of interest from the input device, generating information about the selected C/Us of interest, and displaying said information about the selected C/U s of interest; and receiving other stops and/or destination data, and/or C/Us or other locating information and/or desired radius limitations, generating and displaying a list of other stops and/or destinations relevant to said other data within the radius limitation to be offered for selection, and receiving a selection of one or more other stops and/or destinations from the input device for adding to the itinerary and planned route or journey and/or providing information about food, gas, and/or lodging.

The method may include that the information generated about the selected C/Us comprises at least one of: student population, average annual tuition, and at least one of tour availability, information sessions, distance, price, schools, divisions, majors, curriculums, clubs, sports, activities, organizations, student information, school information, student qualifications, school qualifications, honors, awards, financial aid, scholarships, student employment information, and size.

The method may include that the locating information is at least one of: longitude and latitude, location coordinates, a city, zip code, street address, street name, state, nearby location, county, village, town, landmark, destination, college, university, school name, phone number in part or in whole, email, web address, social media address, and/or Skype name, a place, structure, event, site, address, tourist site, business, desired location, target location, nearby location, additional location, location, movie theatre, store, office, facility, professional space, professional location, professional office, professional practices, professional address, specialty store, gas, restaurant, food, lodging, hotel, hospital, camp site, and/or medical, dental, and/or health related practices.

The method may include that information generated about the selected C/Us comprises a link to communicate with the C/Us, a link to call the C/Us, a link to the C/U's website, a link to make an online appointment for an interview at the selected C/Us, and a link to the C/U's Facebook page or other social media, and the wireless communication transceiver.

The method may include a mobile device that is a tablet, smart phone, phone, smart device, computer, electronic device, hand held device, iPhone, or iPad, mobile phone, touch-screen computing device, portable media player, smart pad, micro device, portable device, powered device, technical device, electronic component device, iOS device, optical device, optical reader, information or data input communication device, virtual device, or any smart device capable of interfacing with a communications network.

A system for conducting a criteria and location-based search of destinations, preparing an itinerary and mapped route to visit destinations, and communicating with destinations is provided comprising: a mobile device comprising a GPS or other technology receiver, a display, an input device, a microprocessor, a wireless communication transceiver, and a software program that utilizes a storage database containing information related to destinations and other preselected content. The mobile device may be programmed to: receive destination data from the input device; calculate and determine a list of destinations where the information related to destinations and other preselected content from the storage database matches or is comparable to the destination data; receive locating information from the GPS or other technology receiver or the input device and a desired radius limitation from the input device, wherein the locating information is used as the center or starting point from which the radius limitation extends; generate a list and map showing the locations of destinations that are relevant to the destination data, relevant to the information contained in the storage database, and located within the radius limitation received from the input device by calculating the distance between the destinations on the list of destinations where the information related to destinations and other preselected content from the storage database matches or is comparable to the destination data and the locating information and determining which destinations are within the radius limitation received by the input device; display the list of destinations that are relevant to the destination data, relevant to the information contained in the storage database, and located within the radius limitation received from the input device on the display; receive a selection from the input device of one or more destinations from the list and map showing the locations of relevant destinations generated, generate information about the selected destinations, and display said information about the selected destinations, an itinerary of the selected destinations and a planned route or journey on the display, wherein a planned route or journey includes public or other methods of transportation; transmit one-way communication(s) to or transmit to or receive two-way communication(s) from at least one selected destination or location included via the wireless communication transceiver; receive a selection from the input device of one or more destinations from the list of relevant destinations generated, and save the one or more destinations selected from the list of relevant destinations as a group.

The mobile device may be further programmed to execute and perform at least one of: receiving a second locating information, which can be the same or different from the first locating information, and a second desired radius limitation, which can be the same or different from the first desired radius limitation, from the input device, generating and displaying a list and map showing the locations of destinations that are relevant to the destinations data, relevant to the information contained in the storage database, and located within the second radius limitation received from the input device by calculating the distance between the destinations on the list of destinations where the information related to destinations and other preselected content from the storage database matches or is comparable to the destinations data and the second locating information and determining which destinations are within the second radius limitation received by the input device, receiving a selection from the input device of one or more destinations from the list of relevant destinations generated, generating information about the selected destinations, and displaying said information about the selected destinations, an itinerary of the selected destinations and planned route or journey on the display; receiving a request from the input device for a repeat search of destinations within a radius limitation of one or more selected destinations, generating and displaying a list and map of the locations of repeat destinations within the radius limitation of one or more selected destinations, receiving a selection of repeat destinations of interest from the input device, generating information about the selected destinations of interest, and displaying said information about the selected destinations of interest; receiving other stops and/or destination data, and/or destinations or other locating information and/or desired radius limitations, generating and displaying a list of other stops and/or destinations relevant to said other data within the radius limitation to be offered for selection, and receiving a selection of one or more other stops and/or destinations from the input device for adding to the itinerary and planned route or journey and/or providing information about food, gas, and/or lodging; receiving destinations data for another group, which is the same or different from the destinations data previously received from the input device, receiving locating information for said another group, which is the same or different from the locating information previously received by the input device and/e=a desired radius limitation from the input device, and generating and displaying a list of destinations relevant to the destinations data for said another group, and receiving a selection of one or more destinations from the list of destinations relevant to the destinations data for said another group and saving the selected destinations, and receiving further destinations data to generate at least one combined list of destinations.

The method may include that destination data comprises at least one of: type of destination, name of destination, and/or category of destination, or a place, structure, event, site, address, school, tourist site, college, university.

The method may include that business, target location, desired location, nearby location, additional location, location, movie theatre, store, office, facility, professional space, professional location, professional address, professional office, specialty store, gas, restaurant, food, lodging, hotel, hostel, camp site, and/or medical, dental, and/or health related practices, geographic coordinate(s), geolocation, longitude and latitude, measurements, address in part or in whole, a place, structure, event, site, address, school, tourist site, college, or university.

The method may include that the locating information is at least one of: longitude and latitude, location coordinates, a city, zip code, street address, street name, state, nearby location, county, village, town, landmark, destination, college, university, school name, phone number in part or in whole, email, web address, social media address, and/or Skype name.

The method may include that the communication via wireless communication transceiver at least one of, at least 2-way text-to-cell communication, at least 2-way voice communication, at least 2-way social media communications, at least 2-way texting, at least 2-way phone, at least 2-way SMS and/or MMS, and at least 2-way communication.

In some embodiments, the invention is a non-transitory storage device storing a plurality of instructions, to conduct a search, and visit of C/Us wherein said non-transitory storage device comprises a plurality of instructions for: entering student data into an input device; entering locating information and a desired radius limitation into the said input device; and generating C/Us relevant to the student data and within the radius limitation.

The instructions further comprise at least one of the following steps of: selecting one or more C/Us from the relevant C/Us generated, generating information about the selected C/Us, and providing an itinerary of said selected C/Us and a planned route or journey; entering a second locating information, which can be the same or different from the first, and a second desired radius limitation, which can be the same or different from the first, into the input device, generating a second batch of C/Us relevant to the student data and within the second radius limitation, selecting C/Us from the second batch of C/Us, and providing an itinerary based on the first batch and the second batch of the selected C/Us or planned route or journey; requesting a repeat search of C/Us within a radius limitation of one or more selected C/Us, generating repeat C/Us within the radius limitation of one or more selected C/Us, selecting repeat C/Us of interest, generating information about selected C/Us of interest; entering other stops and/or destination data into the said input device; entering the C/Us or other locating information and/or a desired radius limitation into the input device; generating other stops relevant to the other stops data and within the radius limitation if applicable; selecting one or more C/Us from the relevant C/Us generated and saving the selected C/Us as a group; entering student data for another group, which is the same or different from the student data which has already been entered, into said input device, entering locating information for that other group, which is the same or different from the locating information which has already been entered, and/or a desired radius limitation into a input device, generating C/Us relevant to the student data for that other group and/or within the radius limitation, selecting one or more C/Us from the generated C/Us relevant to the student data for that other group and saving the selected C/Us as another group, repeating these steps as often as desired; and entering further student data into the input device to generate a combined list of C/Us from all the groups and relevant to the further student data entered; entering into the input device another set of student data, which is the same or different from the student data which has already been entered, and generating C/Us relevant to the other set of student data from the group of C/Us which has already been selected; providing information about food, gas and/or lodging within a selected radius of selected C/Us; selecting one or more C/Us from the generated C/Us relevant to the student data for said another group and saving the selected C/U s; entering said input device further student data to generate at least one combined list of C/Us; and/or repeating at least one of the above steps as often as desired.

The invention can run on both a computer and/or a smart device. This invention saves time by maximizing efficiency and saves money by minimizing travel costs.

Although preferred embodiments of the present invention have been described herein it will be understood by those skilled in the art that the present invention should not be limited to the described preferred embodiments. Rather, various changes and modifications can be made within the spirit and scope of the present invention.

All the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

DETAILED DESCRIPTION

Figure 1:
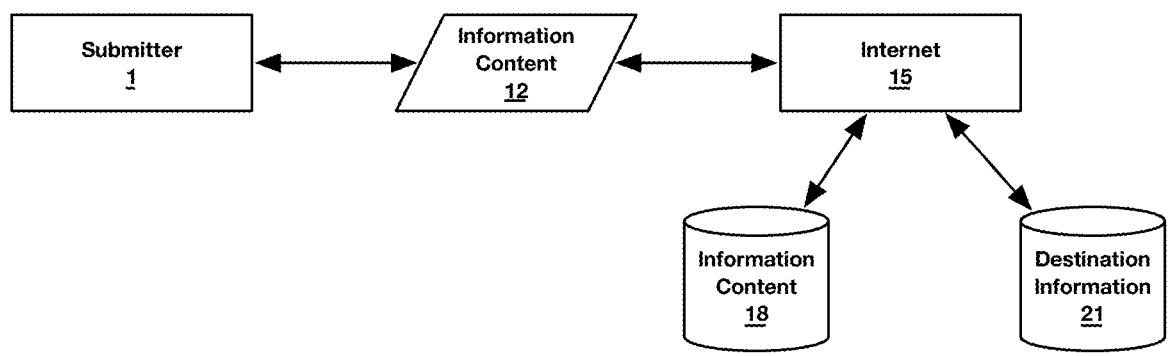
FIG. 1 is a schematic view of an example of the operation of the system and the method for searching for or choosing from destinations.

The following description is intended to facilitate the understanding of the present invention without limiting its scope. According to one embodiment, the invention is a system and a method to conduct a search to visit C/Us comprising the steps of: entering student data into an input device; entering locating information and a desired radius limitation into an input device; and generating C/Us relevant to the student data and within the radius limitation.

Additionally, the system and method of the invention can have a software element that can communicate with a map API to provide directions and/or a map. The map API can be sourced from a third party if desired. Information on public or other transportation (including but not limited to train, plan, boat, and/or ground transportation information) can be obtained from the internet and provided in addition to or instead of the directions and/or map.

The student data may be one or more student qualifications and/or student choices. Examples of student qualifications may include, but are not limited to: standardized test scores (e.g., SAT scores, ACT scores, GPA scores), school attended, school attending, year of graduation, type of school (e.g., public or private school), years of attendance, high school attending, high school attended, type of education, degree(s), grade(s), course(s), curriculum, school rating, class rating, class ranking, student rating, and/or student ranking.

Examples of student choices include, but are not limited to: curriculum, degrees offered, school requirements or criteria, type of school (e.g., public or private), tuition, average tuition, additional school costs, extracurricular activities, school organizations, student organizations, school size, number of students, housing, school statistics, school information, school data, school history, faculty, faculty information, school achievements or honors, school reputation, school area information, distance coordinates, and/or travel considerations.

The input device is where the user enters information for the system and method of the invention to use. Examples include, but are not limited to: smart devices, tablets, smart phones, phones, mobile devices, computers, voice prompt, microphones, fax, facsimile, electronic devices, Bluetooth device, hand held device, touch-screen computing devices, portable media players, smart pads, micro devices, portable devices, powered devices, technical devices, electronic component devices, iOS device (e.g., iPhones and iPads), optical devices, optical readers, GPS devices, etc.

Generally, smart devices include electronic devices that are usually cordless (unless while being charged), mobile (easily transportable), connected or connectable to the virtual or internet (e.g., via Wi-Fi, 3G, 4G etc.). Such devices are typically capable of voice and video communication, internet browsing, geolocation (for search purposes and location-based services) and of operating to some extent autonomously. The term "smart device" can also refer to a ubiquitous computing device, such as a device that exhibits some properties of ubiquitous computing including artificial intelligence. Smart devices can be designed to support a variety of form factors and a range of properties pertaining to ubiquitous computing and can also be any combination of three main system environments: physical world, human-centered environments and distributed computing environments.

The locating information provides the system and method of the invention with a geographic point from which to do a search. Examples include, but are not limited to: a longitude, latitude, location coordinates, city, zip code, street address, street name, state, nearby location, county, village, town, landmark, destination (optionally including a destination address in part or in whole), college, university, school name, phone number (in part or in whole), email, web address, social media address, Skype name, a place, structure, event, site, address, tourist site, business, desired location, target location, nearby location, additional location, movie theatre, store, office, facility, professional space, professional location, professional office, professional practices, professional address, specialty store, gas, restaurant, food, lodging, hotel, hostel, camp site, health-related practices (e.g., medical, dental, etc.) and/or any other information that helps to determine the starting or beginning point of a search and/or that helps to determine any point or destination of a search.

A desired radius limitation can be used and it can be in a specific unit(s) of measurement, including, but not limited to: feet, yards, miles, meters, etc. Also, any amount can be entered as the desired radius limitation, including, but not limited to 1 mile, 5 miles, 10 miles, 15 miles, 20 miles, 30 miles, 40 miles, 50 miles, 75 miles, 100 miles, 150 miles, etc.

Based on the student data and desired radius limitation that have been entered into the input device, the system and method of the invention generates relevant C/Us. That is, the C/Us generated would meet or approximate the student qualifications and/or student choices entered as well as the desired radius limitations. The user can select one or more of the C/Us from the relevant C/Us that are generated.

Then, the system and method of the invention can generate information about the selected C/Us. Examples of such information may include, but is not limited to: student population, average annual tuition, tour availability, information sessions, etc. The information generated about the selected C/Us can be in the form of links, for example, but not limited to, a link to call the C/Us, a link to the C/U's website, a link to the C/U's Facebook page, etc. Still another type of link would be a link to make an online appointment for an interview at the C/Us.

The system and method of the invention can provide an itinerary of the selected C/Us including directions and available public transportation to the selected C/Us. The directions provided with the itinerary can be in any useful format, for example, but not limited to, turn-by-turn, voice, map, etc.

The itinerary can include other stops (e.g., additional destinations) besides C/Us. For example, the user might be interested in finding a store or restaurant for some food, a place to stay overnight, a gas station, a library, a post office, etc. Stops include, for example, places, destinations, or locations of interest to include in your travel plans or trip.

The system and method of the invention can generate such other stops automatically when it generates the C/Us. Also, it can generate specific other stops by the steps of: entering other stops data into the input device; entering the C/Us or other locating information and a desired radius limitation into the input device; and generating other stops relevant to the other stops data and within the radius limitation.

Exemplary stops (e.g., additional destinations) may include, but are not limited to: a place, structure, event, site, address, school, tourist site, college, university, business, desired location, target location, nearby location, additional location, location, movie theatre, store, office, facility, professional space, professional location, professional address, professional office, professional practice, specialty store, gas, restaurant, food, lodging, hotel, hostel, camp site, and/or health-related practices (e.g., medical, dental, etc.). And each of such stops may be associated with destination data, such as but not limited to: a type, a name, a chain with which the stop is associated, geographic coordinate(s), geo-location, longitude and/or latitude, measurements, address (in part or in whole) and/or other stops.

As a specific example, a landmark may be considered a destination (e.g., Grand Central Terminal). Examples of other landmarks include, but are not limited to, the Washington Monument, the Empire State Building, a specific Frank Lloyd Wright house, etc. Other specific examples of destinations include, but are not limited to, airports, zoos, parks, beaches, foreign countries, etc.

One feature of the system and method of the invention is that it is easy to find other C/Us near the originally selected C/Us. There are several ways of doing this. The original search will, of course, include any C/Us near the originally selected C/Us.

Another way is to run the original search again. Input the same student data, the same or similar locating information (any one of the selected C/Us or associated data can be used as the locating information), and the same, or similar, or even a different radius limitation. The system and method of the invention will then generate relevant C/Us (relevant to the student data, locating information and radius limitation).

Other or additional C/Us can be found at the start of the trip or during the trip if, for example, the user finds that there is more time to visit more C/Us. Another way to find nearby C/Us is by entering the input device a second locating information, which can be the same or different from the first, and a second desired radius limitation, which can be the same or different from the first. This will generate a second batch of C/Us relevant to the student data and within the second radius limitation. The user can then select C/Us from the second batch of C/Us. The system and method of the invention can then provide an itinerary, including directions/available public transportation, based on the first batch and the second batch of the selected C/Us.

In addition to the above-described methods of finding other C/Us near the originally selected C/Us, the system and method of the invention can find nearby C/Us by repeating a search of C/Us within a radius limitation of one or more of the selected C/Us; generating repeat C/Us within the radius limitation of one or more of the selected C/Us; selecting repeat C/Us of interest; and generating information about the selected C/Us of interest.

Another embodiment of the invention does not need student data to be input. Instead, just locating information and a desired radius limitation are input or sent to an input device. The system and method of the invention can then generate C/Us within the radius limitation. The user can select C/Us of interest and then the system and method of the invention can generate information about the selected C/Us. In this embodiment, it is possible for the system and method of the invention to generate all C/Us within the radius limitation. It is also possible to generate an itinerary with directions. The locating information, desired radius limitation and type of input device can be the same or different as in the other embodiments.

In yet another embodiment, the system and method of the invention conducts a search of destinations to visit comprising the steps of: entering destination data into an input device; entering locating information and/or a desired radius limitation into the input device; and generating destinations relevant to the destination data and/or within the radius limitation. The destination data, locating information, desired radius limitation, and type of input device can be the same or different as in the other embodiments.

The system and method of searching destinations can further comprise the steps of: selecting one or more destinations from the relevant destinations generated; generating information about the selected destinations; and providing directions/information on available public transportation based on the selected destinations.

Additional destinations can be found, for example, by: entering a second locating information, which can be the same or different from the first, and a desired second radius limitation, which can be the same or different from the first, into the input device; generating a second batch of destinations relevant to the destination data and within the second radius limitation; selecting destinations from the second batch of destinations; and providing directions and/or information on available public transportation based on the first batch and the second batch of the selected destinations.

Additional nearby destinations can be found, for example, by: requesting a repeat search of destinations within a radius limitation of one or more selected destinations; generating repeat destinations within the radius limitation of one or more selected destinations; selecting repeat destinations of interest; and generating information about selected destinations of interest.

Additional nearby destinations can also be found, for example, by: entering destination data for a nearby destination into an input device; entering locating information for the original destination and a desired radius limitation into the input device; and generating nearby destinations relevant to the destination data and within the radius limitation.

Figure 9:
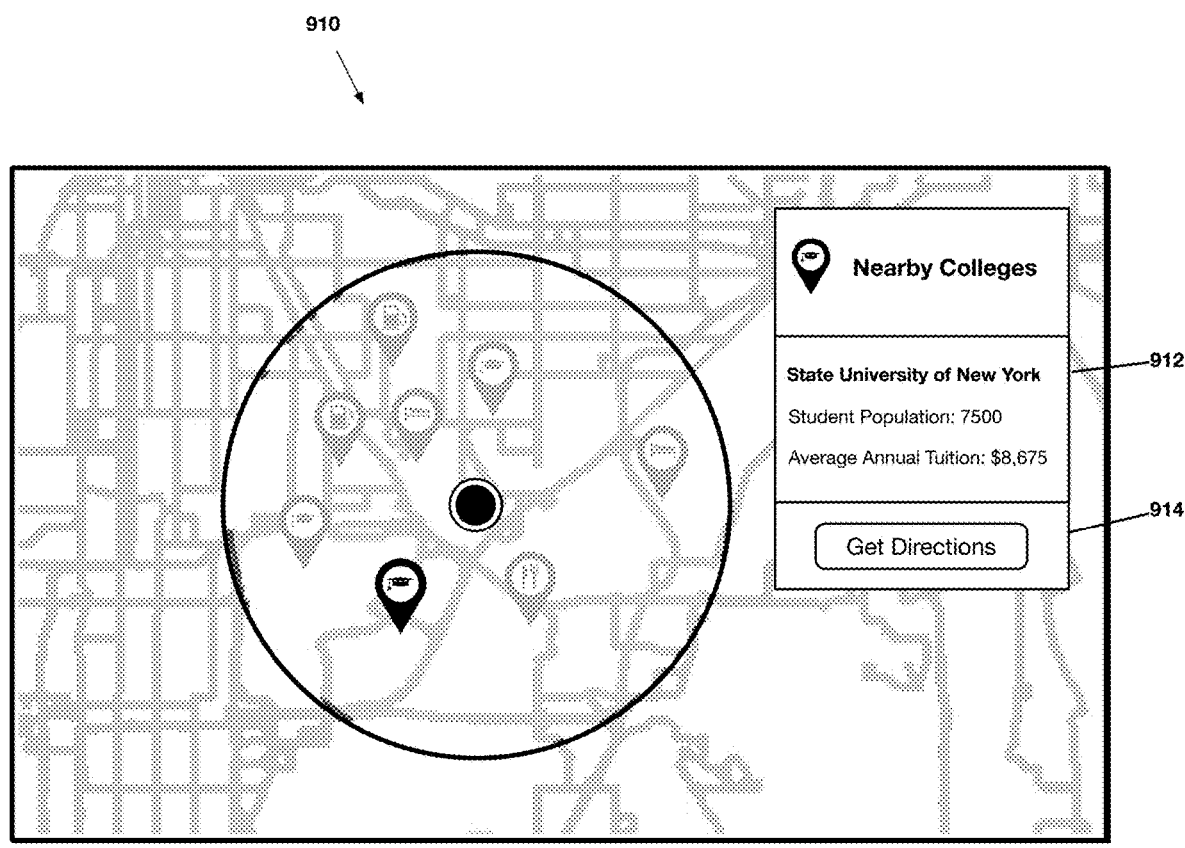
FIG. 9 depicts another example of a results screen.
Figure 10:
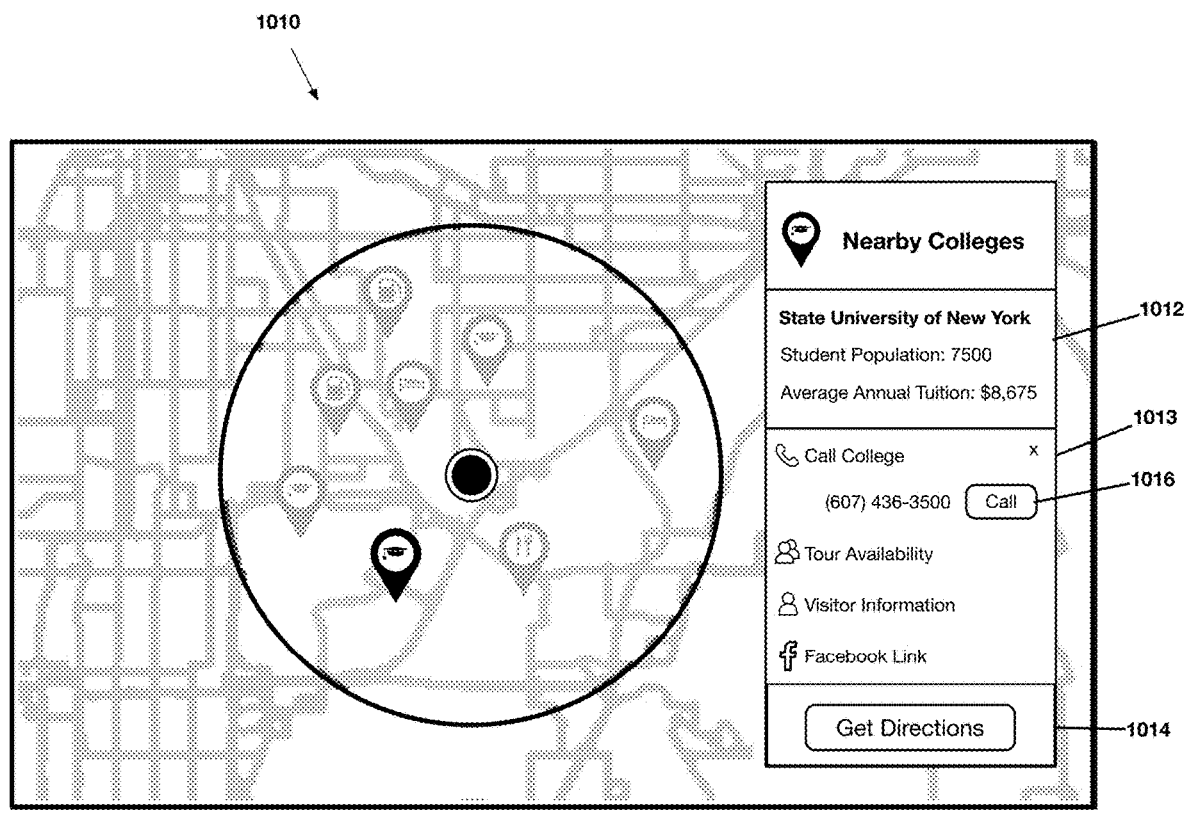
FIG. 10 depicts another example of a results screen.
Figure 11:
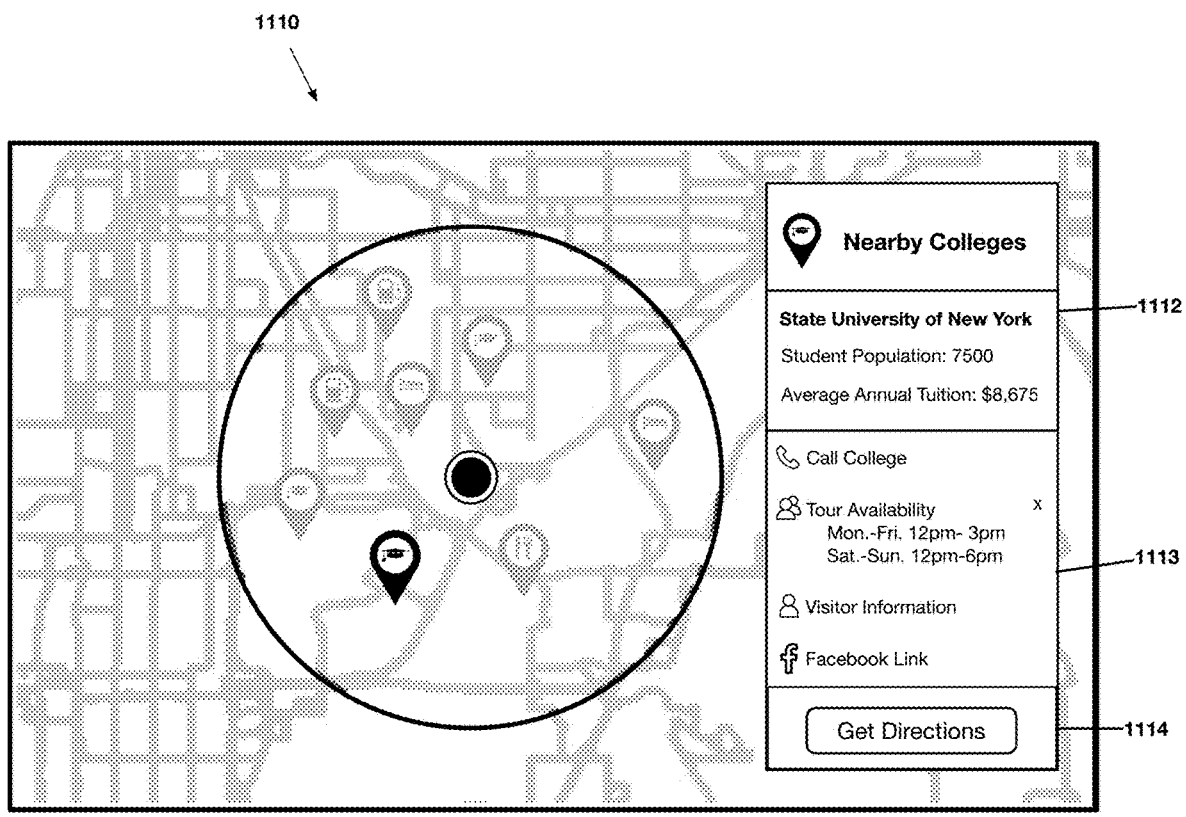
FIG. 11 depicts another example of a results screen.

In an example of the invention, a user can search a specific city, zip code, or even a street address and all higher learning institutions within a user defined radius will pop up. Then the user can tap a school of interest and obtain information that at a glance can help decide if it's a school worth checking out. For example, a screen pops up with student population, average annual tuition, as shown in FIG. 9. It can also provide the user with links to optional information such as to call the college, obtain information on tour availability, make an appointment for an interview, visitor information, Facebook link, etc., as shown in FIGS. 10 and 11.

Figure 12:
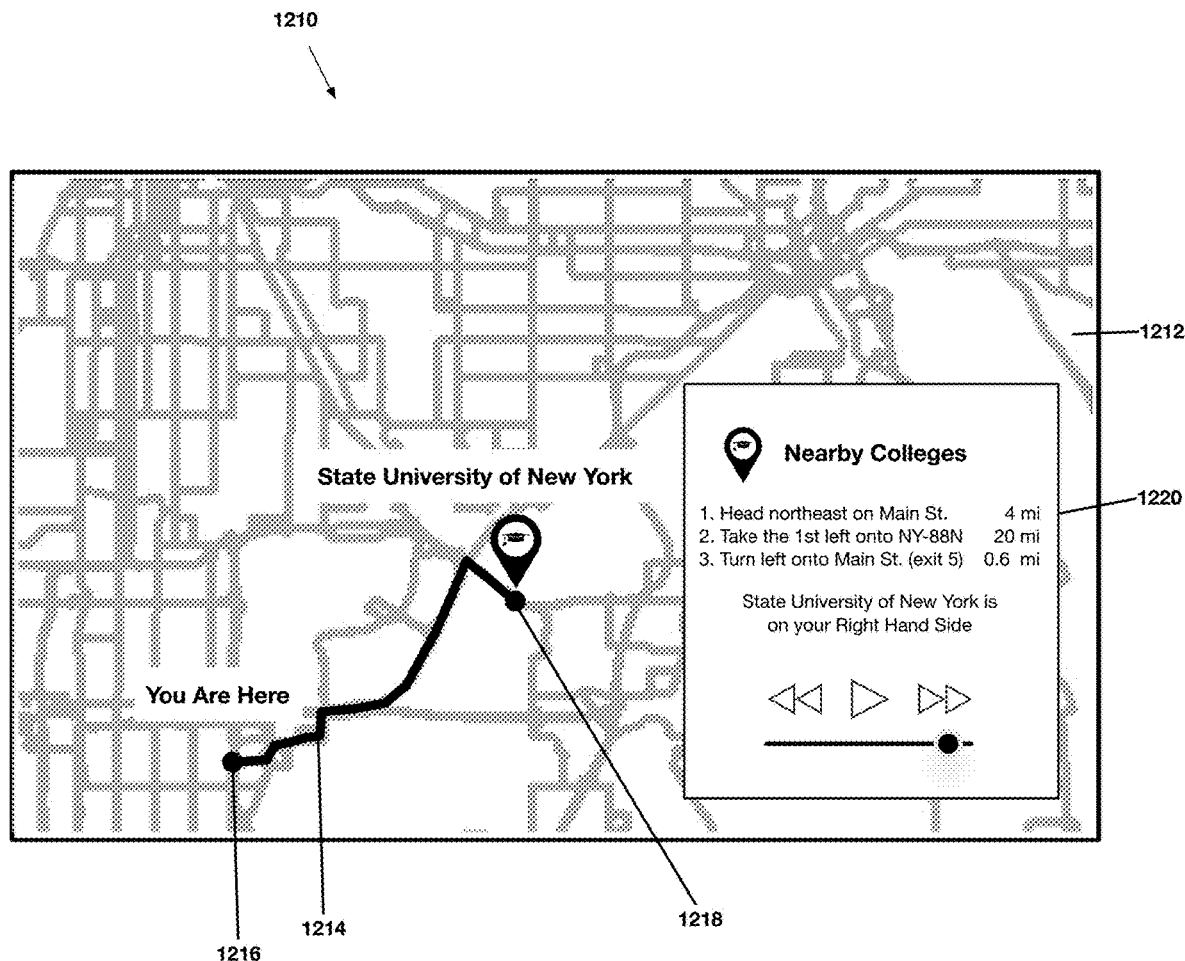
FIG. 12 depicts another example of a results screen.

Also, directions can be accessed through an online map tool for quick planning of a driving route as shown in FIG. 12 and information on food, lodging, gas, etc. can be displayed. And, while on the road, the user can make quick and efficient changes in route when opportunities arise to see other schools and/or other stops and/or destinations, e.g., when there is more time available. It is easy to adjust the route if desired.

Some basic components of the system and method to search for or choose from destinations in accordance with the present invention are illustrated in FIG. 1. The flow is between the submitter/user 1 and the system 37 which includes an interface with the app 12 where the information/content is entered by the (user) submitter 1. The information/content then goes to the Internet 15 (e.g., world wide web, any virtual network, a wide-area network ("WAN"), and/or a local-area network ("LAN")). The Internet 15 is connected to storage database 18, which holds the information/content which has been entered into the system through the input device. The Internet 15 is also connected to storage database 21, which holds the destination information.

Figure 2:
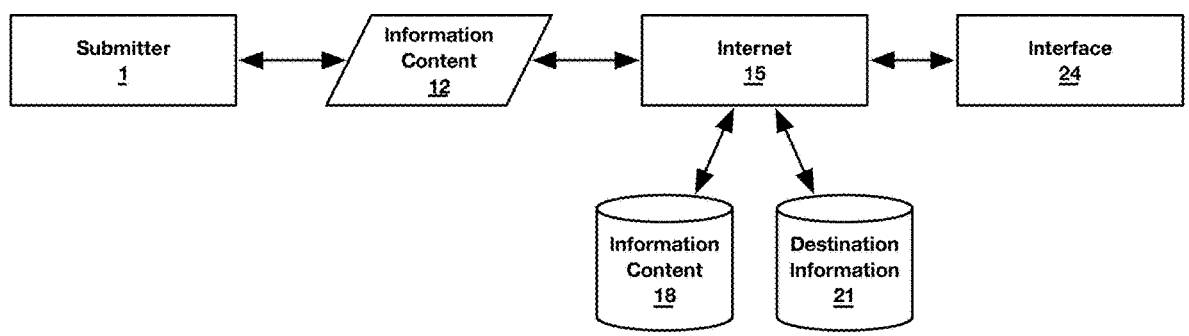
FIG. 2 is a schematic view of an example of the operation of another embodiment of the system and the method for searching for or choosing from destinations.

FIG. 2 depicts another embodiment of the invention showing system 37 in which additional steps can be added at interface 24.

Figure 3:
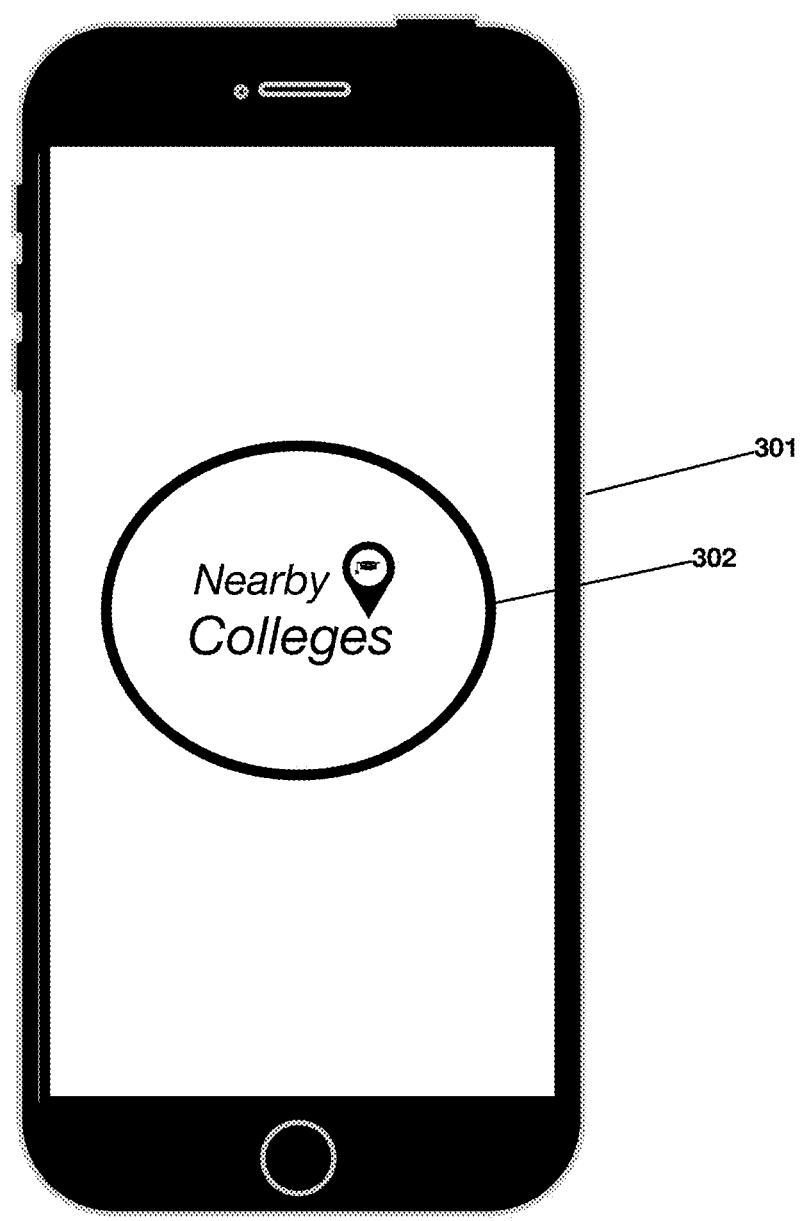
FIG. 3 depicts a smartphone 301 with a Nearby Colleges Icon 302. Submitter clicks the mobile application icon to startup/initiate the mobile application.

FIG. 3 depicts a smartphone 301 with a mobile application icon 302 (i.e., "Nearby Colleges"). Submitter clicks the icon 302 to startup/initiate a mobile application.

Figure 4:
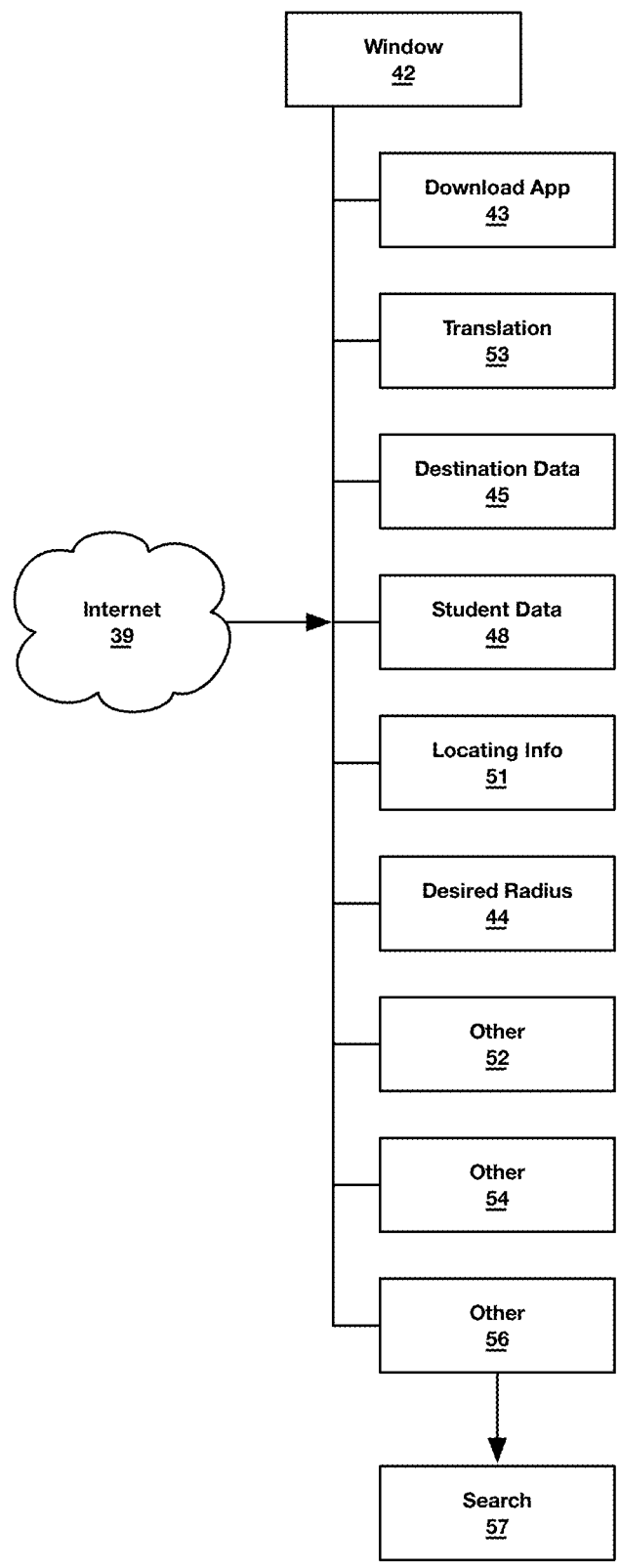
FIG. 4 depicts an example of the flow of creating a new search request.

Referring to FIG. 4, an embodiment of a message submitter/user screen 1 is shown. In the embodiment of FIG. 4, a person who would like to submit a search request ("submitter" or "user") may optionally select to download a smart device application by clicking or selecting the application allocated on screen 1, and continue the process from the smart device or continue on screen 1 by first selecting the message window 42 from the designated website or application, optionally selecting from the language choices available 53 for the application, in whole or in part, and then select and identify destination data 45, and/or student data 48, together with locating information 51 and desired radius 44. Other search specific information can be entered in, e.g., 52, 54, 56, etc. Lastly, the submitter would click the graphic icon 57 (i.e., "Search") to submit the search request.

Figure 5:
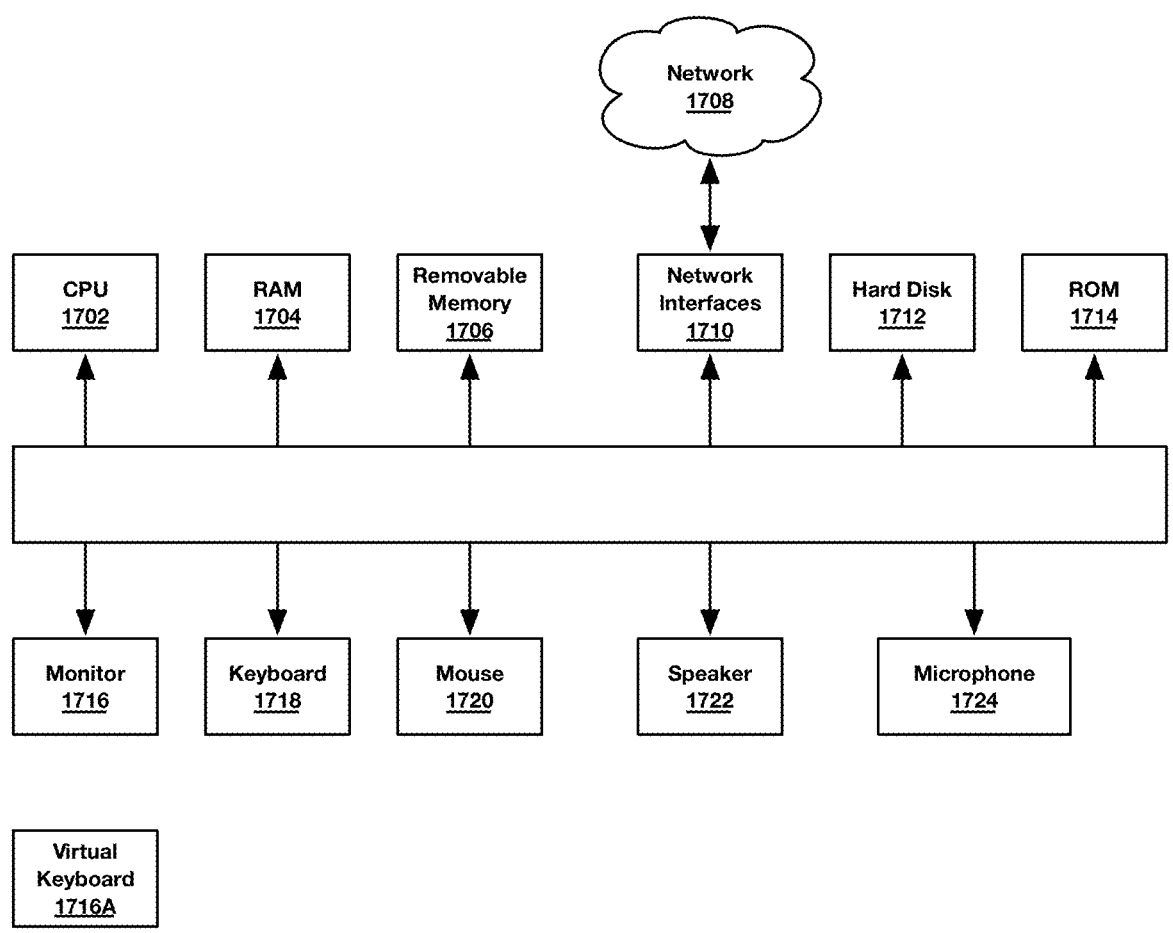
FIG. 5 depicts an illustrated block diagram of an exemplary information handling system.

FIG. 5 depicts an illustrated block diagram of an exemplary information handling system. The information handling system comprises a bus that connects (either directly, or in combination with another bus) a Central Processing Unit ("CPU" or processor) 1702 to RAM 1704, hard disc 1712, ROM 1714, and input/output devices. Additionally, the bus can have an interface for receiving removable memory 1706. Removable memory can include but is not limited to an optical disc, a memory card, a "boot" drive, etc. Additionally, the bus can connect the CPU 1702 to network interface(s) 1710. The network interface(s) 1710 can either physically or wirelessly connect the information handling system to one or more networks 1708 such as, but not limited to, the internet, WAN, and/or LAN, the Public System Telephone Network, a cellular telephone network, or a cellular data network.

Some input devices can include a mouse 1720, a keyboard 1718, and/or a microphone 1724. The output devices can include a screen 1716 and/or speaker(s) 1722. In certain embodiments, the screen 1716 can be heat or touch sensitive so as to project a virtual keyboard 1716A for receiving inputs, thus not requiring a keyboard 1718 or mouse 1720.

According to certain embodiments of the present invention, the invention incorporates a plurality of instructions that are executable by the CPU 1702, residing in any combination of RAM 1704, Removable Memory 1706, hard disc 1712, or ROM 1714. Additionally, the instructions can reside at a node on the network. It will be understood that storage of said instructions in the node, RAM 1704, Removable Memory 1706, hard disc 1712, or ROM 1714 changes the foregoing, chemically, electrically, and/or electromagnetically.

Figure 6:
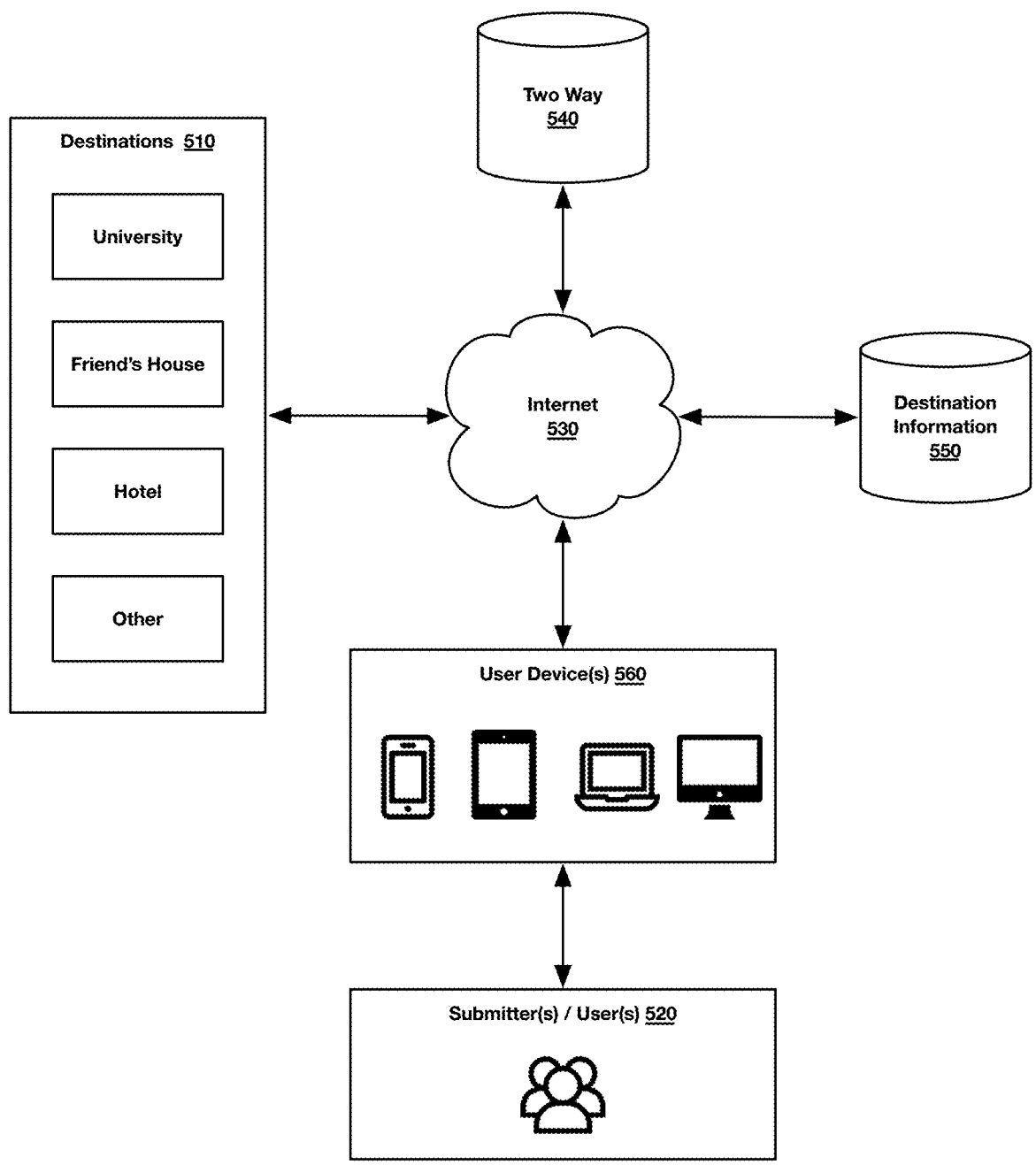
FIG. 6 depicts an example of a typical system enabling bi-directional connection.

FIG. 6 depicts a typical system 37 enabling bi-directional connection via the cloud 530 (which can be comprised of one of more of the following: the interne, a virtual network, social network, world wide web, WAN, and/or LAN) of a collection of submitter(s)/user(s) 520 using user devices 560 such as a smart phone, tablet, computer, laptop, etc. with a collection of destinations 510 representing a variety of different places such as universities, friend's houses, hotels, and other places, and their bi-directional communication is enabled by a two-way communicator 540 for making reservations, appointments, etc. Information about the destinations is stored in storage database 550 which holds the destination information.

By enabling bi-directional connection, the enterer (person entering information) can communicate directly with one or more of the generated C/Us or other destination using a communicator such as, but not limited to, 2-way text-to-cell communication, 2-way voice communication, 2-way social media communications, 2-way texting, 2-way phone, 2-way SMS, MMS, 2-way communication etc.

Figure 7:
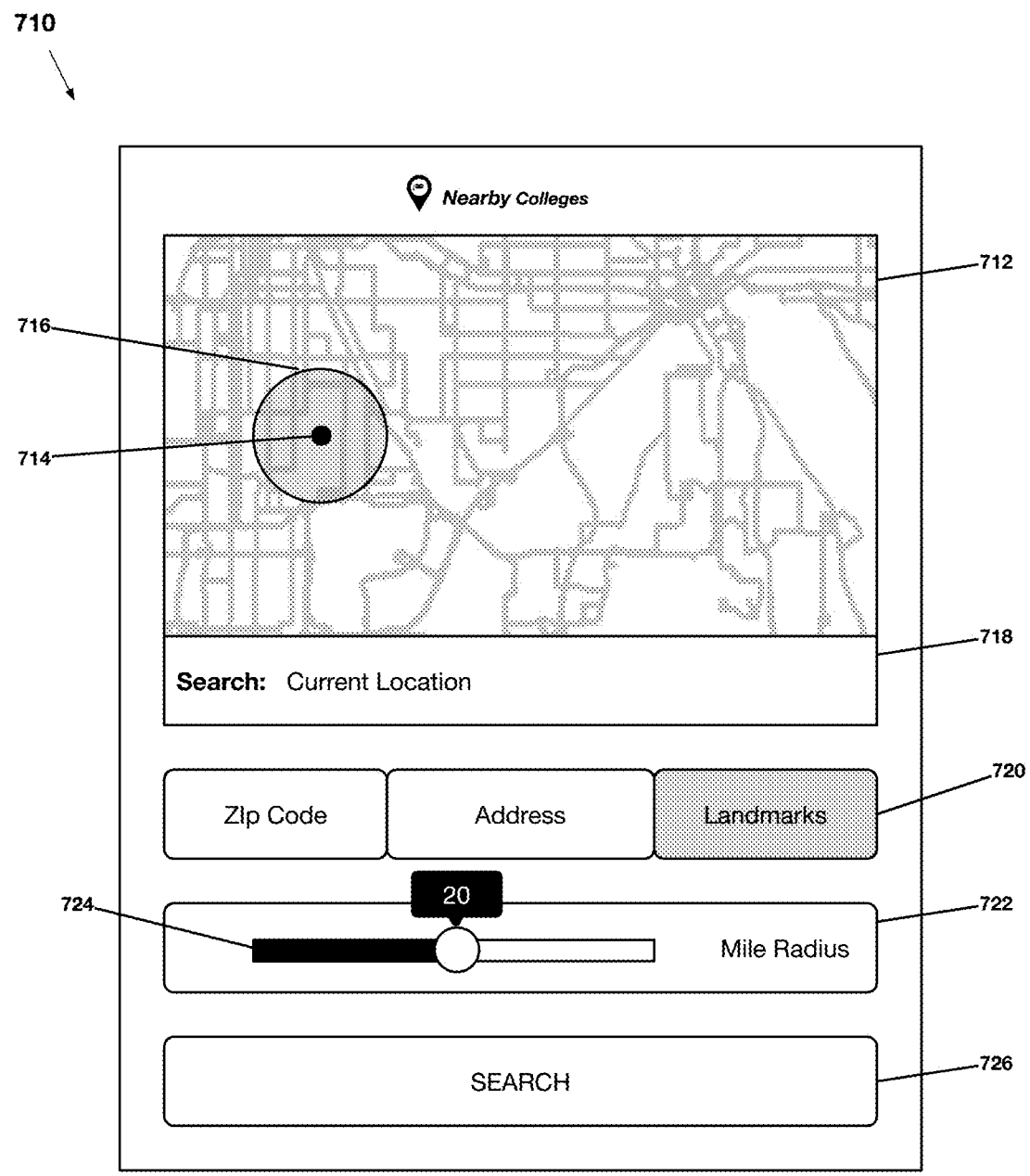
FIG. 7 depicts a search screen.

FIG. 7 shows an example of a search screen 710. It provides a map 712. In this example, the map 712 shows the point 714 of the chosen locating information at the center of an encircled area 716, which represents the radius searched. Also included is a search section 718 for the user to input the locating information, which in this example is "current location." In this embodiment, there is also a choice of three different types of locating information 720 (i.e., zip code, address, or landmarks). In this example, the landmarks selection is highlighted showing that was chosen. Although three choices are shown in this example, more or fewer choices can be provided on the screen or in a drop-down menu. Also shown is a mile radius section 722 in which the user can select the radius to be searched. Mile radius section 722 in this embodiment in this example provides a sliding bar selection mechanism 724 which is set at 20 miles. When sliding bar selection mechanism 724 is moved to the left (for example, but not limited to, by dragging with a mouse, dragging a finger across the screen, dragging a stylus across the screen, using arrow keys, etc.) a radius of less than 20 miles can be chosen. When sliding bar selection mechanism 724 is moved to the right, a radius of more than 20 miles can be chosen.

The mile radius section 722 can also or instead be provided with units other than miles for measuring distance (by way of non-limiting example, feet, meters, kilometers, etc.). Also, the section for choosing the radius, which is mile radius section 722 in this example, does not have to employ a sliding bar mechanism. Any method of inputting a desired radius can be used, for example, but not limited to, by way of a drop-down menu with choices of potential radius values, using number keys, etc.

Also included in search screen 710 of FIG. 7 is a search selection section 726. In the present example, it is simply labeled "SEARCH." Any method of selecting search selection section 726 can be used, for example, but not limited to, a mouse, a finger, a stylus, an enter key, arrow keys, etc.

Figure 8:
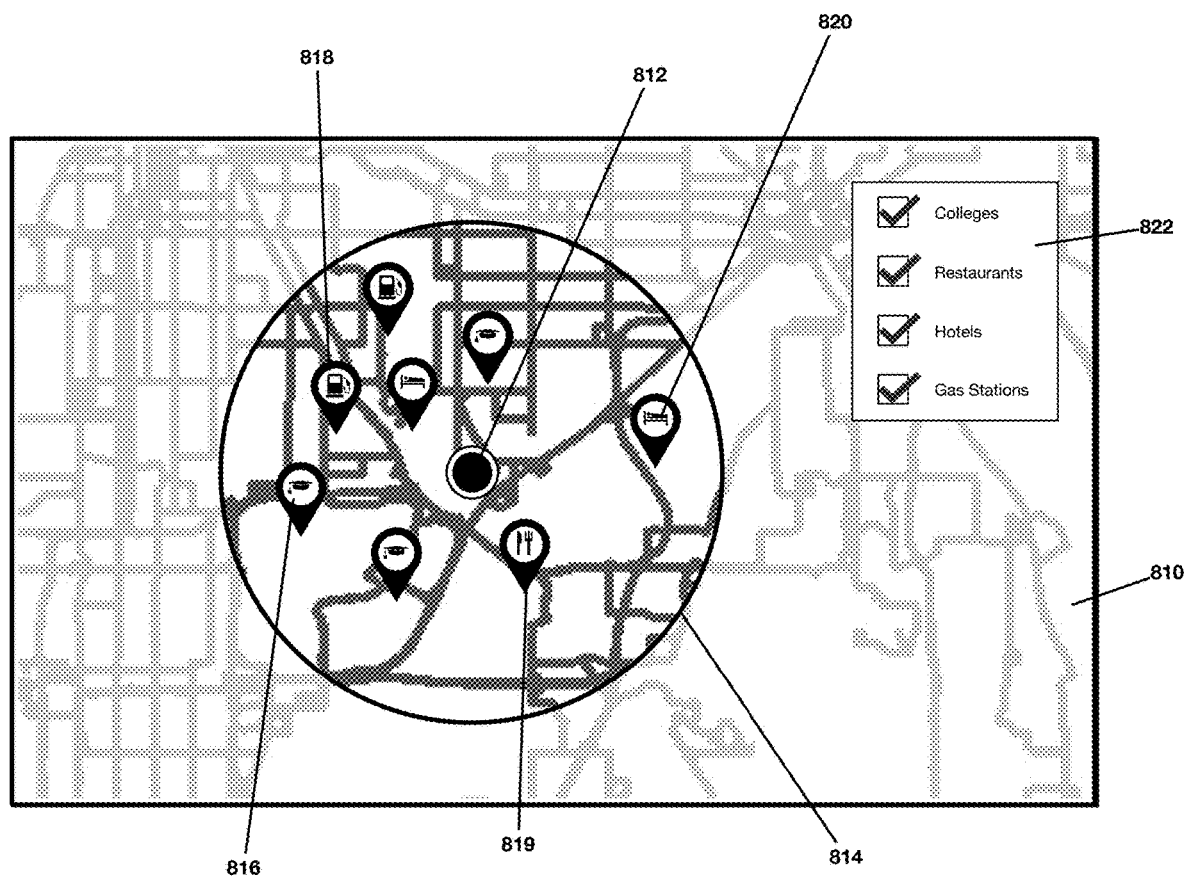
FIG. 8 depicts an example of a results screen.

FIG. 8 is an example of a screen showing generated search results. It includes a map 810, having a center point 812, and being enclosed in a circle 814 which delineates the radius searched from the center point 812. Also enclosed in circle 814 are C/Us 816, gas stations 818, restaurants 819, and hotels 820. A key 822 to the symbols for these other stops is included as well. Some symbols that might appear on the screen depicted in FIG. 8 are for example a knife and fork icon for restaurants, graduation that for C/Us, a gas pump icon for gas stations, and/or a bed icon for hotels and/or lodging. The key 822 and/or the icons can have color distinctions. This type of search result screen, an example of which is shown in FIG. 8, could, in accordance with this invention, show only C/Us, or show only other stops (e.g., the gas stations, restaurants, and hotels shown in FIG. 8), and/or show other potential stops in addition to the other stops.

FIG. 9 is one example of a screen 910 which could pop up after selecting a C/U symbol in FIG. 8. In the example shown in FIG. 9, the screen 910 provides student data information in an information section 912. The student data information shown in this example includes the name of the school, its student population and its average annual tuition. The screen 910 also includes a direction selection section 914 labeled "GET DIRECTIONS." Any method of selecting direction selection section 914 can be used, for example, but not limited to, a mouse, a finger, a stylus, an enter key, arrow keys, etc.

FIG. 10 is an example of a screen 1010, which pops up after selecting a C/U symbol in FIG. 8. In the example shown in FIG. 10, the screen 1010 provides student data information in an information section 1012 (like information section 912). Screen 1010 also provides additional student data information in another information section 1013. The additional student data information available in this example includes links to call the college, obtain information on tour availability, obtain visitor information, and Facebook. Any method of selecting one or more of these links to additional student data information can be used, for example, but not limited to, a mouse, a finger, a stylus, an enter key, arrow keys, etc. In the example shown in FIG. 10, the "Call College" link has been selected, and a phone number is displayed, and a link 1016 to call the college using the device displaying the screen 1010 can be selected. Any method of selecting link 1016 to call the college can be used, for example, but not limited to, a mouse, a finger, a stylus, an enter key, arrow keys, etc.

The screen 1010 also includes a direction selection section 1014 labeled "GET DIRECTIONS." Any method of selecting direction selection section 1014 can be used, for example, but not limited to, a mouse, a finger, a stylus, an enter key, arrow keys, etc.

FIG. 11 is another example of a screen 1110 which pops up after selecting a C/U symbol in FIG. 8. In the example shown in FIG. 11, the screen 1110 provides student data information in an information section 1112 (like information section 912 and 1012). Screen 1110 also provides additional student data information in another information section 1113. The additional student data information available in this example includes links to call the college, obtain information on tour availability, obtain visitor information, and a Facebook link. Any method of selecting one or more of these links to additional student data information can be used, for example, but not limited to, a mouse, a finger, a stylus, an enter key, arrow keys, etc. In the example shown in FIG. 11, the "Tour Availability" link has been selected and the tour schedule is displayed.

The screen 1110 also includes a direction selection section 1114 labeled "GET DIRECTIONS". Any method of selecting direction selection section 1114 can be used, for example, but not limited to, a mouse, a finger, a stylus, an enter key, arrow keys, etc.

FIG. 12 is an example of a screen 1210 which pops up after selecting a direction selection section, such as 1014 in FIG. 10 or 1114 in FIG. 11. It includes a map 1212 which shows the route 1214 to follow for the directions. The route 1214 is shown starting at a start point 1216 labeled "You Are Here" and ending at an end point 1218 which includes the icon for C/Us and is labeled "State University of New York." Also, turn-by-turn directions are included in direction section 1220.

The system and method can further comprise that the enterer/user can communicate directly with one or more of the generated C/Us with multiple communications that each can be more than 2-way communications.

The system and method can further comprise that the enterer/user can communicate directly with one or more of the generated C/Us using a communicator comprising at least one of the following: at least 2-way text-to-cell communication; at least 2-way voice communication; at least 2-way social media communications; at least 2-way texting; at least 2-way phone; at least 2-way SMS and/or MMS; and/or at least 2-way communication.

The invention can be a non-transitory storage device storing a plurality of instructions, to conduct a search, and/or visit of C/Us wherein said non-transitory storage device comprises a plurality of instructions for: entering student data into an input device; entering locating information and a desired radius limitation into the input device; and generating C/Us relevant to the student data and within the radius limitation.

The non-transitory storage device can further have instructions for at least one of the following: selecting one or more C/Us from the relevant C/Us generated, generating information about the selected C/Us, and/or providing an itinerary of selected C/Us or planned route or journey; or entering a second locating information, which can be the same or different from the first, and a second desired radius limitation, which can be the same or different from the first, into the input device, generating a second batch of C/Us relevant to the student data and within the second radius limitation, selecting C/Us from the second batch of C/Us, and providing an itinerary based on the first batch and the second batch of the selected C/Us or planned route or journey; requesting a repeat search of C/Us within a radius limitation of one or more selected C/Us, generating repeat C/Us within the radius limitation of one or more selected C/Us, selecting repeat C/Us of interest, generating information about selected C/Us of interest; entering other stops or destination data into the input device; entering the C/Us or other locating information and/or a desired radius limitation into the input device; generating other stops relevant to the other stops data and within the radius limitation if applicable; selecting one or more C/Us from the relevant C/Us generated and saving the selected C/Us as a group; entering student data for another group, which is the same or different from the student data which has already been entered, into an input device, entering locating information for that other group, which is the same or different from the locating information which has already been entered, and/or a desired radius limitation into an input device, generating C/Us relevant to the student data for that other group and/or within the radius limitation, selecting one or more C/Us from the generated C/Us relevant to the student data for that other group and saving the selected C/Us as another group, repeating the first through fourth steps as often as desired; entering further student data into the input device to generate a combined list of C/Us from all the groups and relevant to the further student data entered; entering into the input device another set of student data, which is the same or different from the student data which has already been entered, and generating C/Us relevant to the other set of student data from the group of C/Us which has already been selected; and/or providing information about food, gas and/or lodging within a selected radius of the selected C/Us.

At least one embodiment is a method for travel planning and creating a group of C/Us, which are coordinated locations and destinations for at least one travel plan having associated at least one itinerary and at least one map, which all include visitation only to those C/Us meeting a specific customized criteria, and also providing criteria and information for communicating with the selected C/Us or providing for direct communication that is immediate and in real time to the C/Us contained in the at least one new uniquely created group and further including selecting from a uniquely formatted on screen visual presentation of all the relevant choices presented to the at least one user for selection comprising of the following steps: (1) initiating the method by: (a) downloading a specific customized software application and/or registering for a sign-in process, (b) initiating and running of the said specific customized software application on a user computer and/or smart device, operated by at least one user; or (c) initiating and running of the said specific customized software application on a user computer and/or smart device, operated by at least one user; and (d) performing any associated or required sign-in process; (2) receiving of the input of student data, input by at least one user, wherein said student data is comprised of specific student qualifications and student choices; (3) utilizing said computer or user smart device comprising of in part or in whole at least one of each of: a GPS or other technology receiver, a display, an input device, a microprocessor, a wireless communication transceiver, and running said specific customized software application; (4) performing real time simultaneous multi-source data gathering, analysis, and derivation that utilizes at least one storage database said storage database also containing information related to C/Us and other preselected content; (5) gathering, analyzing and coordinating at least one efficient "customized grouping" also called "unique list" or "unique group" of locations and destinations where the information related to locations and destinations and other associated preselected content from real time simultaneous multi-source data gathering, analysis, and derivation including but not limited to retrieving data from the at least one storage database, matches or is comparable to the criteria requested by input by the said at least one user and determining said unique list of C/Us where the information related to C/Us and other preselected content from the said at least one storage database matches or is comparable to the criteria of the said student data; (6) receiving specific locating information from the GPS or other technology receiver live or supplied from the input device or user input, and a desired radius limitation(s) from user input to said input device, wherein the locating information is used as the center or starting point from which the radius limitation(s) extends; (7) generating a unique list or group and an associated map coordinating locations and destinations to be presented in a unique formatted visual presentation showing the locations of C/Us that are relevant to the student data, relevant to the information contained in the storage database or retrieved in search, and located within the radius limitation received from the information input into the input device by calculating the distance between the C/Us on the list of C/Us where the information related to C/Us and other preselected content from the storage database matches or is comparable to the student data and the locating information and determining which C/Us are within the radius limitation received by the input device; (8) displaying in said unique formatted visual presentation the said unique list or group of C/Us that are relevant to the student data, relevant to the information contained in the storage database, and located within the radius limitation received from the input device on the display; (9) receiving a selection from the information input into the input device of one or more C/Us from the list and map showing the locations of relevant C/Us generated, generate information about the selected C/Us, and display said information about the selected C/Us, an itinerary of the selected C/Us and a planned route or journey on the display, wherein the planned route or journey includes public or other methods of transportation, selected by the at least one user customizing the unique group from a unique formatted visual presentation to said user utilizing a user smart device running a specific software application; (10) transmitting one-way communication(s), or two-way, or transmitting to and receiving two-way communication(s) from selected, and preferred Locations and Destinations via the wireless communication transceiver; (11) receiving a selection from the input device of one or more C/Us from the list of relevant C/Us generated, and save the one or more C/Us selected from the list of relevant C/Us as a new group created by the combination of these steps, and (12) executing and performing at least one of: (a) receiving a second group of locating information, and a second desired radius limitation from the input device, (b) generating and displaying a second unique list and associated at least one map showing the locations of C/Us that are relevant to the student data, relevant to the information gathered, analyzed, and/or contained in the storage database, and located within the second radius limitation received from the input device by calculating the distance between the relevant C/Us on the list of C/Us where the information related to C/Us and other preselected content gathered, analyzed, and/or contained from the storage database matches or is comparable to the student data and the second locating information and determining which C/Us are within the second radius limitation received by the input device, (c) receiving a selection from the input device of one or more C/Us from the list of relevant C/Us generated, generating information about the selected C/Us, and displaying said information about the selected C/Us, coordinated travel plan, and itinerary of the selected C/Us and planned route or journey; (d) receiving a request from the input device for a repeat search of C/Us within a radius limitation of one or more selected C/Us, (e) generating and displaying at least one coordinated list and associated at least one map of the locations of repeat search C/Us within the radius limitation of one or more selected C/Us, (f) receiving a selection of relevant repeat search resulting C/Us of interest from the input device, generating information about the selected C/Us of interest, and storing, and displaying said information about the selected C/Us of interest on the display; (g) receiving other stops and/or destination data, and/or C/Us or other locating information and/or desired radius limitations, generating and displaying at least one relevant list of other stops and/or destinations relevant to said other data within the radius limitation to be offered for selection, and (h) receiving a selection of one or more other stops and/or destinations from the input device for adding to the at least one coordinated travel plan, associated at least one itinerary and map(s) and planned route or journey and/or providing information or upon request providing information about food, gas, and/or lodging, storing same, and visually displaying this at least one uniquely created new group; (i) receiving student data for another request for another at least one group, which is the same or different from the student data previously received from the input device, receiving locating information for said another group, which is the same or different from the locating information previously received by the input device and/or a desired radius limitation from the input device, and generating and displaying at least one coordinated list of C/Us relevant to the student data for said another at least one new group, and receiving a selection of one or more C/Us from the list of C/Us relevant to the student data for said another at least one group and saving the selected C/Us and uniquely visual displaying the at least one new created group, and (j) receiving further student data to generate at least one combined list and group of C/Us.

At least one embodiment is comprised of a system for conducting a location-based search of CUs, preparing a real time and immediate coordinated travel plan, itinerary and mapped route to visit C/Us, and communicating with C/Us which includes a customized application and resulting in efficient customized grouping and coordination of selected locations and destinations based on the combination of user selected important criteria, radius searching, and real time simultaneous multi-source data gathering, analysis, and derivation executed by and uniquely visually presented on a computer and/or smart device for user preference comprising: (1) a computer and/or mobile device comprising a GPS or other technology receiver, a display, an input device, a microprocessor and, a wireless communication transceiver, and a customized software program that utilizes information from user selected important criteria, radius searching, and real time simultaneous multi-source data gathering, analysis, and derivation and information stored in a storage database, the computer and/or mobile device programmed to: (a) receive locating information from the GPS or other technology receiver or the input device and a desired radius limitation from the input device, wherein the locating information is used as the center or starting point from which the radius limitation extends; (b) generate and display a coordinated list and associated at least one map, the said list displaying and the associated at least one map showing the locations of all C/Us that are located within the radius limitation received from the input device by calculating the distance between the C/Us and the locating information and determining which C/Us are within the radius limitation received by the input device; (c) receiving at least one selection from the input device of one or more C/Us from the said list displaying, and said associated at least one map showing the coordinated locations of relevant C/Us generated, generating information about the selected C/Us, and uniquely visually displaying said information about the selected C/Us, coordinated travel plan, and associated coordinated itinerary of the selected C/Us and a planned coordinated route or journey on the visual display, wherein the planned coordinated route or journey includes or includes upon input request information on public or other methods of transportation available; (d) transmitting one-way communication(s) to or transmitting to or receiving from at least two-way communication(s) from at least one selected destination C/U via wireless communication; (e) receiving a selection from the input device of one or more C/Us from the uniquely created coordinated list of relevant C/Us generated, and save the one or more C/Us selected from the list of relevant C/Us as a group; and (f) executing and performing at least one of: (i) receiving second locating information, which can be the same or different from the first locating information, and a second desired radius limitation, which can be the same or different from the first desired radius limitation, from the input device, (ii) generating and displaying at least one uniquely created and coordinated list and at least one associated map showing the locations of all selected C/Us that are located within the second radius limitation received from the input device by calculating the distance between the C/Us and analyzing the second locating information and determining which C/Us are relevant and within the second radius limitation received by the input device, (iii) receiving a selection from the input device of one or more C/Us from the list of relevant C/Us generated, generating information about the selected C/Us, and (iv) uniquely visually displaying said information about the selected C/Us, and associated travel plan, and itinerary of the selected C/Us and planned route or journey on the visual display; (g) receiving a request from the input device for a repeat search of C/Us within a radius limitation of one or more selected C/Us, (h) generating and displaying a list and map of the locations of repeat C/Us within the radius limitation of one or more selected C/Us, (i) receiving a selection of repeat C/Us of interest from the input device, (j) generating information about the selected C/Us of interest, displaying said information about the selected C/U s of interest; and (k) receiving other stops and/or destination data, and/or C/Us or other locating information and/or desired radius limitations, (l) generating and displaying at least one uniquely created list of other stops and/or destinations relevant to said other data within the radius limitation to be offered for selection, and (m) receiving a selection of one or more other stops and/or destinations from the input device for adding to the travel plan, itinerary and planned route or journey and (n) providing or if requested providing information about food, gas, and/or lodging.

At least one embodiment is a system for conducting a criteria and location-based search of destinations, preparing an itinerary and mapped route to visit destinations, and communicating with destinations comprising: (1) a mobile device comprising a GPS or other technology receiver, a display, an input device, a microprocessor, a wireless communication transceiver, and a software program that utilizes a storage database containing information related to destinations and other preselected content, the mobile device programmed to: (a) receive destination data from the input device, (b) calculate and determine a list of destinations where the information related to destinations and other preselected content from the storage database matches or is comparable to the destination data, (c) receive locating information from the GPS or other technology receiver or the input device and a desired radius limitation from the input device, wherein the locating information is used as the center or starting point from which the radius limitation extends, (d) generate a list and map showing the locations of destinations that are relevant to the destination data, relevant to the information contained in the storage database, and located within the radius limitation received from the input device by calculating the distance between the destinations on the list of destinations where the information related to destinations and other preselected content from the storage database matches or is comparable to the destination data and the locating information and determining which destinations are within the radius limitation received by the input device, (e) display the list of destinations that are relevant to the destination data, relevant to the information contained in the storage database, and located within the radius limitation received from the input device on the display, (f) receive a selection from the input device of one or more destinations from the list and map showing the locations of relevant destinations generated, (g) generate information about the selected destinations, and (h) display said information about the selected destinations, an itinerary of the selected destinations and a planned route or journey on the display, wherein the planned route or journey includes public or other methods of transportation, (i) transmit one-way communication(s) to or transmit to or receive two-way communication(s) from at least one selected destination or location included via the wireless communication transceiver, (j) receive a selection from the input device of one or more destinations from the list of relevant destinations generated, and save the one or more destinations selected from the list of relevant destinations as a group; and (k) execute and perform at least one of: (i) receiving a second locating information, which can be the same or different from the first locating information, and a second desired radius limitation, which can be the same or different from the first desired radius limitation, from the input device, (ii) generating and displaying a list and map showing the locations of destinations that are relevant to the destinations data, relevant to the information contained in the storage database, and located within the second radius limitation received from the input device by calculating the distance between the destinations on the list of destinations where the information related to destinations and other preselected content from the storage database matches or is comparable to the destinations data and the second locating information and (iii) determining which destinations are within the second radius limitation received by the input device, (iv) receiving a selection from the input device of one or more destinations from the list of relevant destinations generated, (v) generating information about the selected destinations, and (vi) displaying said information about the selected destinations, an itinerary of the selected destinations and planned route or journey on the display, (vii) receiving a request from the input device for a repeat search of destinations within a radius limitation of one or more selected destinations, (viii) generating and displaying a list and map of the locations of, repeat destinations within the radius limitation of one or more selected destinations, (ix) receiving a selection of repeat destinations of interest from the input device, (x) generating information about the selected destinations of interest, and (xi) displaying said information about the selected destinations of interest, (xii) receiving other stops and/or destination data, and/or destinations or other locating information and/or desired radius limitations, (xiii) generating and displaying a list of other stops and/or destinations relevant to said other data within the radius limitation to be offered for selection, and (xiv) receiving a selection of one or more other stops and/or destinations from the input device for adding to the itinerary and planned route or journey and/or providing information about food, gas, and/or lodging, (xv) receiving destinations data for another group, which is the same or different from the destinations data previously received from the input device, (xvi) receiving locating information for said another group, which is the same or different from the locating information previously received by the input device and/or a desired radius limitation from the input device, and (xvii) generating and displaying a list of destinations relevant to the destinations data for said another group, and (xviii) receiving a selection of one or more destinations from the list of destinations relevant to the destinations data for said another group and saving the selected destinations, and (xix) receiving further destinations data to generate at least one combined list of destinations.

At least one embodiment is a non-transitory storage device storing a plurality of instructions, to conduct a search, and visit of C/Us wherein said non-transitory storage device comprises a plurality of instructions for: (1) entering critical student data into an input device; (2) entering locating information and a desired radius limitation into the said input device; and (3) generating at least one coordinated list C/Us relevant to the student data and within the radius limitation; wherein the instructions further comprise at least one of the following steps of: (a) selecting one or more C/Us from the relevant C/Us generated after real time analysis and coordination, (b) generating information about the selected C/Us, and (c) immediately providing in real time an itinerary of said selected C/Us and an immediate real time coordinated planned route or journey including all selected locations and destinations; (4) entering a second locating information, which can be the same or different from the first, and a second desired radius limitation, which can be the same or different from the first, into the input device, (5) generating a second batch of C/Us relevant to the student data and within the second radius limitation, (6) selecting C/Us from the second batch of C/Us, and (7) providing at least one travel plan, and itinerary based on the first batch and the second batch of the selected C/Us or planned route or journey; (8) requesting a repeat search of C/Us within a radius limitation of me or more selected C/Us, (9) generating repeat C/Us within the radius limitation of one or more selected C/Us, (10) selecting repeat C/Us of interest, generating information about selected C/Us of interest; (11) entering other stops and/or destination data into the said input device; (12) entering the C/Us or other locating information and/or a desired radius limitation into the input device; (13) generating a rating other stops relevant to the other stops data and within the radius limitation if applicable; (14) running and further comprising a software element that can utilize a map; (15) selecting one or more C/Us from the relevant C/Us generated and saving the selected C/Us as a group; (16) entering student data for another group, which is the same or different from the student data which has already been entered, into said input device, (17) entering locating information for that other group, which is the same or different from the locating information which has already been entered, and/or a desired radius limitation into a input device, (18) generating C/Us relevant to the student data for that other group and/or within the radius limitation, (19) selecting one or more C/Us from the generated C/Us relevant to the student data for that other group and saving the selected C/Us as another group, (20) repeating these steps as often as desired; and (21) entering further student data into the input device to generate a combined list of C/Us from all the groups and relevant to the further student data entered; (22) entering the input device another set of student data, which is the same or different from the student data which has already been entered, and generating C/Us relevant to the other set of student data from the group of C/Us which has already been selected; (23) communicating directly with one or more of the generated and/or selected C/Us comprising at least one of the following: at least a 2-way text-to-cell communication, at least a 2-way voice communication, at least a 2-way social media communications, at least a 2-way texting, at least a 2-way phone, at least a 2-way SMS or MMS, at least 2-way wireless communication; (24) production of a real-time travel plan, map, and itinerary or prior to final production of a real-time travel plan, map, and itinerary and this said communication may result in further input of data by user to be analysis for generation of a new group stored and visually presented to user for selection and production of a real-time travel plan, map, and itinerary; (25) providing information about food, gas and/or lodging within a selected radius of selected C/Us; (26) selecting one or more C/Us from the generated C/Us relevant to the student data for said another group and saving the selected C/Us; (27) entering said input device further student data to generate at least one combined list of C/Us; and/or (28) repeating at least one of the above steps.

In the above embodiment, the C/Us may be input in real time along with the other critical information and/or radius information for immediate analysis and production of a real-time travel plan, map, and itinerary may. Such C/Us may be C/Us and/or any location or destination and/or the student data input can be student data as defined herein or just data deemed by user as critical to the said real time analysis and production of a real-time travel plan, map, and itinerary.

At least one embodiment is a method for travel planning which includes a customized application and resulting in efficient customized grouping and coordination of selected locations and destinations based on the combination of user selected important criteria, radius searching, and real time simultaneous multi-source data gathering, analysis, and derivation executed by and presented on a computer and/or smart device for user preference. Such embodiment may comprise of the following steps: (1) initiating the method by: (a) downloading a specific customized software application, and/or registering for a sign in process, (b) initiating and running of the said specific customized software application on a user computer and/or smart device, operated by at least one user; (b) or initiating and running of the specific customized software application on a user computer and/or smart device, operated by at least one user; (2) receiving data containing important criteria input by at least one user wherein said data is comprised of specific qualifications and choices, utilizing said computer and/or smart device, and running said specific customized software application performing real time simultaneous multi-source data gathering, analysis, and derivation including but not limited to the utilizing of at least one storage database containing information related to locations and destinations and other associated preselected content; (3) gathering, analyzing and coordinating said efficient customized grouping also called "unique list" or "unique group" of locations and destinations where the information related to locations and destinations and other associated preselected content from real time simultaneous multi-source data gathering, analysis, and derivation including but not limited to the said at least one storage database, matches or is comparable to the criteria of the said data input by the at least one user; (4) receiving specific locating information from the GPS or other technology receiver live or supplied from the input device and at least one desired radius limitation from user input to said input device, wherein the locating information is used as the center or starting point from which at least one desired radius limitation extends; (5) generating a unique list or group and map coordinating locations and destinations to be presented in a unique formatted visual presentation showing said locations and destinations that are relevant to the data input by said at least one user, relevant to the information contained in the storage database, and located within the radius limitation received from the information input into the input device by calculating the distance between the locations and destinations on the list of locations and destinations where the information related to locations and destinations and other preselected content from the storage database matches or is comparable to the data and the locating information and determining which locations and destinations are within the radius limitation received by the input device; (6) displaying in said unique formatted visual presentation the said unique list or group of said locations and destinations that are relevant to the data, relevant to the information contained in the storage database, and located within the radius limitation received from the input device on the display; (7) receiving a selection by user from the information input into the input device of one or more locations and destinations from the list and map showing the locations of relevant locations and destinations generated; (8) generate information about the selected locations and destinations, and display said information about the selected locations and destinations, an itinerary of the selected locations and destinations and a planned route or journey on the display, wherein the planned route or journey includes public or other methods of transportation, selected by at least one user customizing the unique group from a unique formatted visual presentation to said user utilizing a user smart device running a specific software application; (10) transmitting communication(s) to and receiving communication(s) from selected, and preferred locations and destinations via the wireless communication transceiver; (11) receiving a selection from the input device of one or more C/Us from the list of relevant locations and destinations generated, and save the one or more locations and destinations selected from the list of relevant locations and destinations as a new group created by the combination of these steps, and; (12) executing and performing at least one of: (a) receiving a second group of locating information, and a second desired radius limitation from the input device, (b) generating and displaying a second unique list and map showing the locations of locations and destinations that are relevant to the data, relevant to the information contained in the storage database, and located within the second radius limitation received from the input device by calculating the distance between the locations and destinations on the list of locations and destinations where the information related to locations and destinations and other preselected content from the storage database matches or is comparable to the data and the second locating information and (c) determining which locations and destinations are within the second radius limitation received by the input device, (d) receiving a selection from the input device of one or more locations and destinations from the list of relevant locations and destinations generated, (e) generating information about the selected locations and destinations, and (f) displaying said information about the selected locations and destinations, an itinerary of the selected locations and destinations and planned route or journey on the display a new group created; (g) receiving a request from the input device for a repeat search of locations and destinations within a radius limitation of one or more selected locations and destinations, (h) generating, analyzing, and displaying at least one uniquely created list and map of the locations of repeat locations and destinations within the radius limitation of one or more selected locations and destinations, (i) receiving a selection of repeat locations and destinations of interest from the input device, (j) generating information about the selected locations and destinations of interest, and (k) displaying said information about the selected locations and destinations of interest on the display a new group created by the combination of these steps; (13) receiving other stops and destinations data, and/or locations and destinations or other locating information and/or desired radius limitations, (14) generating, analyzing, and displaying at least one uniquely created and coordinated list of other stops and destinations relevant to said other data within the radius limitation to be offered for selection, and (15) receiving a selection of one or more other stops and destinations from the input device for adding to the at least one uniquely created and coordinated travel plan, itinerary, map(s) and planned route or journey and/or providing information or upon request providing information about food, gas, and/or lodging; (16) receiving data for creating another at least one uniquely created group, which is the same or different from the data previously received from the input device, (17) receiving locating information for said at least one another uniquely created group, which is the same or different from the locating information previously received by the input device and receiving a desired radius limitation from the input device, and (18) generating, analyzing, and displaying in a unique visual format a coordinated list of locations and destinations relevant to the data for said another at least one new unique group, and (19) receiving a selection of one or more locations and destinations from the said at least one uniquely created new list of locations and destinations relevant to the data for said another group and saving the selected locations and destinations on the display a new group created, and (20) receiving further data to generate at least one combined coordinated list and group of locations and destinations.

While the instant invention has been shown and described in accordance with preferred and practical embodiments thereof, it is recognized that departures from the instant disclosure are contemplated within the spirit and scope of the present invention. Therefore, the true scope of the invention should not be limited since other modifications will become apparent to those skilled in the art upon a study of the claims, drawings, descriptions, explanations, and specifications herein. It is understood that various changes and modifications can be made within the spirit and scope of the present invention.

What is claimed is:

1. A computer-implemented method comprising:
   storing, by a server, in a database, a plurality of colleges and universities ("C/Us"), each of the C/Us associated with:

C/U student qualifications information relating to one or more of: a standardized test score, a grade point average ("GPA"), a student ranking, a required degree, a required course, and a required grade;

C/U information relating to one or more of: contact information, curriculum information, degree information, tuition information, size information, admissions information, tour information, visitor information, extracurricular activity information, reputation information, a type, student population information and faculty information; and a C/U location;

storing, by the server, in the database, a plurality of destinations, each of the destinations associated with a destination location;

receiving, by the server, from an input device associated with a user, user student qualifications information relating to one or more of: a standardized test score associated with the user, a GPA associated with the user, a high school associated with the user, a student ranking associated with the user, a degree associated with the user, a completed course associated with the user, and a grade associated with the user;

receiving, by the server, from the input device, user preferences information relating to one or more of: a desired curriculum offered by a C/U, a degree offered by a C/U, a tuition charged by a C/U, a C/U size, an extracurricular activity offered by a C/U, a C/U reputation, a C/U type, and C/U faculty;

receiving, by the server, from the input device, locating information comprising at least one of: a location of the user, a location of the input device, and a location designated by the user;

receiving, by the server, from the input device, a desired radius limitation;

transmitting, by the server, to the input device, one or more matching C/Us selected from the plurality of C/Us stored in the database, upon a determination that:
the C/U location associated with each of the matching C/Us is within the desired radius limitation of the locating information;
the received user student qualifications information is comparable to the C/U student qualifications information associated with each of the matching C/Us; and
the received user preferences information is comparable to the C/U information associated with each of the matching C/Us;

receiving, by the server, from the input device, a selected C/U selected from the one or more matching C/Us; and determining, by the server, one or more determined destinations from the plurality of destinations stored in the database,
wherein the destination location associated with each of the one or more determined destinations is within the desired radius limitation of the location of the selected C/U;

transmitting, by the server, to the input device:
a map interface comprising:
the selected C/U; and
the one or more determined destinations; and
at least a portion of the C/U information associated with the selected C/U, the portion of the C/U information comprising the contact information.

2. A computer-implemented method according to claim 1, wherein the C/U information associated with each of the C/Us stored in the database further comprises information relating to at least one of: student employment, financial aid, majors, information sessions, clubs, sports, activities, and organizations.

3. A computer-implemented method according to claim 1, wherein each of the destinations stored in the database is further associated with destination information comprising at least one of: a destination name and a destination type.

4. A computer-implemented method according to claim 3, further comprising:
transmitting, by the server, to the input device, the destination information associated with each of the transmitted destinations.

5. A computer-implemented method according to claim 3, wherein the destination type is selected from the group consisting of: a structure, an address, a school, a college, a university, a tourist site, a university, a business, a movie theatre, a store, an office, a facility, a gas station, a restaurant, lodging, a hotel, a hostel, and a landmark.

6. A computer-implemented method according to claim 1, wherein the location information comprises one or more of: an address, a street name, a city, a zip code, a state, a county, a village, a town, a landmark, and a C/U name.

7. A computer-implemented method according to claim 1, wherein the transmitted portion of the C/U information associated with each of the selected C/Us further comprises one or more of: a link to obtain information relating to tour availability, a link to schedule a visit, a link to schedule an interview, a link to obtain visitor information, a link to a social media account, and a link to a website.

8. A computer-implemented method according to claim 1, wherein:
the locating information comprises the location of the input device; and
the method further comprises:
generating transit directions from the location of the input device to the selected C/U; and
transmitting the transit directions to the input device such that they are displayed to the user via the transmitted map interface.

9. A computer-implemented method according to claim 8, wherein the transit directions further comprise a route from the location of the input device to a selected destination selected from the determined destinations.

10. A computer-implemented method according to claim 9, wherein the transit directions further comprise a route from the selected destination to the selected C/U.

11. A computer-implemented method according to claim 8, wherein the transit directions further comprise a route from the selected C/U to at least one of the determined destinations.

12. A computer program product encoded on one or more non-transitory computer storage media, the computer program product comprising instructions that when executed by one or more computers cause the one or more computers to perform operations comprising:
storing, by the one or more computers, in a database, a plurality of colleges and universities ("C/Us"), each of the C/Us associated with:
C/U student qualifications information relating to one or more of: a standardized test score, a grade point average ("GPA"), a student ranking, a required degree, a required course, and a required grade;
C/U information relating to one or more of: contact information, curriculum information, degree information, tuition information, size information, admissions information, tour information, visitor information, extracurricular activity information, reputation information, a type, student population information and faculty information; and a C/U location;

storing, by the one or more computers, in the database, a plurality of destinations, each of the destinations associated with a destination location;

receiving, by the one or more computers, from an input device associated with a user, user student qualifications information relating to one or more of: a standardized test score associated with the user, a GPA associated with the user, a student ranking associated with the user, a degree associated with the user, a completed course associated with the user, and a grade associated with the user;

receiving, by the one or more computers, from the input device, user preferences information relating to one or more of: a desired curriculum offered by a C/U, a degree offered by a C/U, a tuition charged by a C/U, a C/U size, an extracurricular activity offered by a C/U, a C/U reputation, a C/U type, and C/U faculty;

receiving, by the one or more computers, from the input device, locating information comprising at least one of: a location of the user, a location of the input device, and a location designated by the user;

receiving, by the one or more computers, from the input device, a desired radius limitation;

transmitting, by the one or more computers, to the input device, one or more matching C/Us selected from the plurality of C/Us stored in the database, upon a determination that:

the C/U location associated with each of the matching C/Us is within the desired radius limitation of the locating information;

the received user student qualifications information is comparable to the C/U student qualifications information associated with each of the matching C/Us; and the received user preferences information is comparable to the C/U information associated with each of the matching C/Us;

receiving, by the one or more computers, from the input device, a selected C/U selected from the one or more matching C/Us; and determining, by the one or more computers, one or more determined destinations from the plurality of destinations stored in the database, wherein the destination location associated with each of the one or more determined destinations is within the desired radius limitation of the location of the selected C/U;

transmitting, by the one or more computers, to the input device:

a map interface comprising:

the selected C/U; and the one or more determined destinations; and at least a portion of the C/U information associated with the selected C/U, the portion of the C/U information comprising the contact information.

13. A computer program product according to claim 12, wherein the C/U information associated with each of the C/Us stored in the database further comprises information relating to at least one of: student employment, financial aid, majors, information sessions, clubs, sports, activities, and organizations.

14. A computer program product according to claim 12, wherein each of the destinations stored in the database is further associated with destination information comprising at least one of: a destination name and a destination type.

15. A computer program product according to claim 14, wherein the operations further comprise:

transmitting, by the server, to the input device, the destination information associated with each of the transmitted destinations.

16. A computer program product according to claim 14, wherein the destination type is selected from the group consisting of: a structure, an address, a school, a college, a university, a tourist site, a university, a business, a movie theatre, a store, an office, a facility, a gas station, a restaurant, lodging, a hotel, a hostel, and a landmark.

17. A computer program product according to claim 12, wherein the location information comprises one or more of: an address, a street name, a city, a zip code, a state, a county, a village, a town, a landmark, and a C/U name.

18. A computer program product according to claim 12, wherein the transmitted portion of the C/U information associated with each of the selected C/Us further comprises one or more of: a link to obtain information relating to tour availability, a link to schedule a visit, a link to schedule an interview, a link to obtain visitor information, a link to a social media account, and a link to a website.

19. A computer program product according to claim 12, wherein:

the locating information comprises the location of the input device; and the operations further comprise:

generating transit directions from the location of the input device to the selected C/U; and transmitting the transit directions to the input device such that they are displayed to the user via the transmitted map interface.

20. A computer program product according to claim 19, wherein the transit directions further comprise a route from the location of the input device to at least one destination selected from the determined destinations.

* * * * *